US009566493B2

(12) United States Patent
Kim

(10) Patent No.: US 9,566,493 B2
(45) Date of Patent: Feb. 14, 2017

(54) HOUSING-TYPE GOLF-SIMULATION APPARATUS

(76) Inventor: Yong Hoon Kim, Incheon (KR)

( * ) Notice: Subject to any disclaimer, the term of this patent is extended or adjusted under 35 U.S.C. 154(b) by 574 days.

(21) Appl. No.: 14/123,487

(22) PCT Filed: Jun. 2, 2012

(86) PCT No.: PCT/KR2012/004348
§ 371 (c)(1),
(2), (4) Date: Feb. 17, 2014

(87) PCT Pub. No.: WO2012/165902
PCT Pub. Date: Dec. 6, 2012

(65) Prior Publication Data
US 2014/0162798 A1    Jun. 12, 2014

(30) Foreign Application Priority Data

Jun. 2, 2011  (KR) .................. 10-2011-0053249

(51) Int. Cl.
*A63B 69/36* (2006.01)
*G06K 9/00* (2006.01)
(52) U.S. Cl.
CPC ........... *A63B 69/36* (2013.01); *G06K 9/00342* (2013.01)
(58) Field of Classification Search
CPC ..................................................... A63B 69/36
USPC ....................................................... 473/131
See application file for complete search history.

(56) References Cited

U.S. PATENT DOCUMENTS

| | | | | | |
|---|---|---|---|---|---|
| 1,719,360 | A | * | 7/1929 | Deike | A63B 55/10 211/68 |
| 2,487,441 | A | * | 11/1949 | Heilbronn | B62B 1/262 211/70.2 |
| 3,820,133 | A | * | 6/1974 | Adorney | A63B 24/0003 352/121 |
| 3,918,073 | A | * | 11/1975 | Henderson | A63B 24/0003 352/46 |
| 4,150,825 | A | * | 4/1979 | Wilson | A63B 24/0021 473/152 |
| 4,160,942 | A | * | 7/1979 | Lynch | A63B 24/0021 359/443 |
| 4,767,121 | A | * | 8/1988 | Tonner | A63B 24/0021 473/141 |
| 4,958,836 | A | * | 9/1990 | Onozuka | A63B 69/0091 473/141 |

(Continued)

FOREIGN PATENT DOCUMENTS

JP    06-304278    11/1994
JP    06-86769     12/1994

(Continued)

*Primary Examiner* — Michael Cuff
(74) *Attorney, Agent, or Firm* — IPLA P.A.; James E. Bame

(57) ABSTRACT

A housing type golf simulation apparatus and features the housing that the internal space is available having front, rear, upper and left/right side; monitor installation section which is provided backward in the rear side direction from the said front housing so that the monitor can be seated in the said front housing; golf simulation computer which is provided in the said internal space; and the monitor to be seated in the said monitor installation section. Thus, it is advantageous to implement various additional functions in the housing while installing, managing and moving the entire golf simulation apparatus in an integrated module.

21 Claims, 35 Drawing Sheets

(56) References Cited

U.S. PATENT DOCUMENTS

| | | | | |
|---|---|---|---|---|
| 5,303,924 | A * | 4/1994 | Kluttz | A63B 24/0021 473/155 |
| 5,342,051 | A * | 8/1994 | Rankin | A63B 24/0003 434/252 |
| 5,375,832 | A * | 12/1994 | Witler | A63B 69/36 473/199 |
| D371,480 | S * | 7/1996 | Seng | D6/552 |
| 5,603,617 | A * | 2/1997 | Light | A63B 24/0003 434/247 |
| 5,823,786 | A * | 10/1998 | Easterbrook | A63B 24/0003 434/247 |
| 5,846,139 | A * | 12/1998 | Bair | A63B 24/0021 434/252 |
| 5,860,648 | A * | 1/1999 | Petermeier | A63B 67/02 273/108.2 |
| 5,879,246 | A * | 3/1999 | Gebhardt | A63B 24/0003 473/409 |
| 5,904,484 | A * | 5/1999 | Burns | A63B 24/0003 434/252 |
| 5,906,547 | A * | 5/1999 | Tynan | A63B 24/0003 473/199 |
| 6,093,923 | A * | 7/2000 | Vock | A63B 24/0003 250/206.1 |
| 6,241,622 | B1 * | 6/2001 | Gobush | A63B 24/0003 473/199 |
| 6,396,041 | B1 * | 5/2002 | Vock | A63B 24/0003 250/206.2 |
| 6,474,410 | B1 * | 11/2002 | Minich | H04N 5/64 165/104.33 |
| 6,669,571 | B1 * | 12/2003 | Cameron | A63B 24/0003 473/131 |
| 7,639,481 | B2 * | 12/2009 | Katsumata | F16M 11/04 248/921 |
| 8,414,408 | B2 * | 4/2013 | Nicora | A63B 69/3658 473/154 |
| 8,622,845 | B2 * | 1/2014 | Bissonnette | A63B 24/0003 273/317.2 |
| 8,758,103 | B2 * | 6/2014 | Nicora | A63B 24/0021 382/107 |
| 2002/0173367 | A1 * | 11/2002 | Gobush | A63B 24/0003 473/197 |
| 2003/0109322 | A1 * | 6/2003 | Funk | A63B 24/0003 473/222 |
| 2005/0012023 | A1 * | 1/2005 | Vock | A63B 24/0003 250/206.1 |
| 2006/0063574 | A1 * | 3/2006 | Richardson | A63B 24/0021 463/1 |
| 2011/0219654 | A1 * | 9/2011 | Kroon | G09F 15/0025 40/607.04 |

FOREIGN PATENT DOCUMENTS

| | | |
|---|---|---|
| JP | 2011-024805 | 2/2011 |
| KR | 100973146 | 7/2010 |
| WO | WO03005281 | 1/2003 |

* cited by examiner

HOUSING-TYPE GOLF-SIMULATION APPARATUS

BACKGROUND

The present invention is related with the golf simulation apparatus which is especially able to install, control and move the entire golf simulation apparatus as an integrated module to guarantee the stability of the monitor installation, so it can provide the player with the better use conditions and it is appropriate to implement different functions in the housing.

Recently a golf simulation system was developed to get the better of the limitation in space of the indoor in-door golf practice court.

That is, it measures kinetic data for flying angle and speed of the golf ball in a certain space adjacent to the golf swing box and then output in a 3D video in the screen installed in front of the swing box estimating the flying trajectory of the golf ball.

Then, the player can get a visual effect which is the same effect as playing the golf at the real field since the same video as the real golf course field was input in the control apparatus to output the estimated flying trajectory. Such golf simulation system is usually called as "Screen Golf".

Recently, the technology which upgraded more than the said screen golf has been developed and it is not to output 3D video in the screen as before but to display 3D video in the same monitor as LCD panel so the player can enjoy more clean and real effect screen thanks to the development of the monitor output golf simulation apparatus.

FIG. 1 illustrates the use condition of the golf simulation apparatus by the conventional technology.

As shown in FIG. 1, the conventional technology is: a kinetic sensor (12) which detects and measures the kinetic data including the golf ball speed and flying trajectory hit by the golf club is put in the swing box; kinetic data including the flying trajectory and speed of the golf ball which is measured by the kinetic sensor (12) is received; based on this 3D golf simulation program is run to display the kinetic flying of golf ball in a video so the golf simulation computer (it is also called main body of the golf simulation computer but in this specification it is called the golf simulation computer.) is built in a housing (10)—not shown; a monitor (11) to display the 3D video in the screen is put on the said housing (10); and a target net (Tg) for the player to use the target point swing the golf ball is equipped.

However, the golf simulation apparatus and swing box booth by the said conventional technology have the following problems:

First, in case of the golf simulation apparatus by the conventional technology, the monitor is simply put on a housing (10) so the golf ball hit by the player's golf practice will be dispersed causing problems that the monitor (11) is damaged or broken due to the impact on the monitor (11).

Moreover, when it contacts the monitor (11) on a housing (10) due to the carelessness by player or user, the monitor (11) is fell down causing the damage.

And when moving, each housing (10), monitor (11) and sensor (12) should be put in a storage box individually to move each, so it was inconvenient for keeping and control for moving.

Also, since the monitor (11) was put on a housing (10), the player should pay attention to the monitor (11) by turning or raising his/her head for tee shot or putting so it was not good for the user to watch 3D video displayed on the monitor (11).

Moreover, in case of conventional way, the monitor (11) and golf simulation computer were available separately occupying much spaces and the purchase and installation cost was high causing inconvenience for maintenance.

SUMMARY OF THE INVENTION

This invention is created to solve the above conventional technical problems and the purpose of the golf simulation apparatus in a housing type by this invention is such that:

1. Monitor, kinetic sensor and simulation computer are equipped in a housing to protect the monitor from swing by golf ball as an integrated module so that the maintenance and installation are easy; it is more easy and convenient to move and no worry about falling down or dropping of monitor as before; and monitor is installed putting in front of the housing so that it provides the player with mental stability to improve the user's use conditions.

2. Monitor installation section is designed in such a way that the monitor is installed in a vertical slope and so the player can watch the monitor in the most convenient stance improving the play conditions.

3. The bottom part of the monitor installation area is to be close to golf tee or the difference of the height between the bottom part in the monitor installation area and the golf tee will be available within the required value, so the monitor is positioned in the same visual range zone as the golf ball put on the golf tee and as a result the player can watch the monitor in the most convenient stance without requiring to turn or raise the head consciously.

4. Since the flood door was adopted, the hit golf ball is dispersed, so it can prevent the monitor from being damaged or broken even when impact is given to the monitor.

5. The structure of the club hanging rack and inside the club hanging rack are available in a unique slope plane, so the golf club can be hung in a convenient, safe or stable way.

6. No extra partition for golf swing box is required as the housing (the present invention) is adopted for dual partition for golf swing box and as a result the installation cost of the simulation indoor golf practice court can be saved.

7. It can prevent the monitor from being damaged or broken even when impact is given to the monitor as the hit golf ball is dispersed by adopting monitor protection structure.

8. The monitor can be protected by adopting such structure that the monitor protection plate is installed separately from the monitor installed in a housing and moreover the monitor protection plate can be installed as an option if necessary in such a structure that it is to stand separately from the housing front, not to be installed as a built-in type in a housing, so it can improve the user's use condition.

9. Different sensors can be installed in the housing.

10. The product's cost can be saved by controlling the angle of the monitor in a simple structure.

11. In case of installing the golf simulation apparatus in the outdoor golf practice court, it can block rain into the golf simulation apparatus from the front of the golf practice court, so the kinetic sensor and housing body can be protected.

12. The golf ball feeder which feeds the golf ball automatically is built in the housing, so the golf ball can be fed in a convenient way and no extra golf ball feeder is required, so the keeping and using condition of the entire product can be improved.

13. The storage box to keep golf ball is adapted in a detachable way in the housing, so the golf ball can be fed to the golf ball feeder in a convenient and efficient way and optionally if necessary.

14. In case that the storage box is required for installation by hanging in the housing, the golf ball in the storage box is fed to the golf ball feeder through the conveying pipe and if the storage box is needed to remove from the housing, the exit of the storage box will be closed automatically, so that the golf ball feeding provided by the conveying pipe can be blocked automatically.

15. The HVAC is available inside the housing so the cooling or warm air come from the HVAC will be blown through the air discharger directly to the player who is positioned in the golf swing box and therefore the cooling or warm air can be blown to the player who plays at the golf swing box in a person-to-person individual custom way.

16. The efficiency of the cooling and heating can be enhanced by blowing the cooling and/or warm air to the player who plays at the nearest distance of the golf swing box and also the HVAC energy and the maintenance cost of the golf practice court can be saved at the same time because the cooling or heating is not required at unnecessary place.

17. In case of a certain play such as continuous buddy, eagle and hole-in-one, a gift ticket will be discharged to the housing to be available for the player.

18. In case of a certain play such as continuous buddy, eagle and hole-in-one, a gift will be discharged from the housing to be available for the player.

19. It is installed in such a way that the tee mat with golf tee will be rotated in the housing, so the monitor can be covered and protected in case of folding, but when unfolding it can be used as a golf swing box for player. In addition, the tee mat is adapted as a multi segmentation mat that can be folded in a multi-layer, so different sizes of the tee mat can be provided to meet the play condition.

20. Since the projector is installed in a movable housing and the projector's position can be changed freely, so the distance between the screen and the projector can be controlled allowing the projector to be accessible or move back to/from the screen depending on the screen size to scan the optimal image by the distance to the screen.

21. It can select and output the golf simulation image to either screen or monitor. Especially the user can select or determine if it is to be output to monitor or screen so it can provide the user with the improved golf simulation play condition as a housing type golf simulation apparatus.

The golf simulation apparatus in a housing type which is the present invention to achieve the above purposes is adapted in front, rear, upper and left and right side and it provides the following features: The housing with the inside space; monitor installation section which is available in the direction from the front to the rear side of the said housing; golf simulation computer available in the above inside space; and monitor which is built in the above monitor installation section.

The housing type golf simulation apparatus which is the present invention is adapted: The said monitor installation section is available in bottom part with the said monitor and the upper way from the said bottom part to include the rear side support part supporting the rear side of the said monitor and the said rear side supporting part is adapted in a slope to the rear side against the vertical plane.

The housing type golf simulation apparatus which is the present invention features that the said monitor installation section is adapted in the said housing so that the said monitor can be positioned in the same visual field angle as the golf tee.

The housing type golf simulation apparatus which is the present invention features including a sensor installation section which is available in the front of the said housing separate from the said monitor installation section to install the kinetic sensor; and more kinetic sensor to be installed in the said sensor installation section.

The housing type golf simulation apparatus which is the present invention features opening or closing the said monitor installation section to protect the said monitor and in case of closing, additional flood door that can watch the said monitor screen installed in the said monitor is included.

The housing type golf simulation apparatus which is the present invention features having one or more club hanging rack to hang the golf club in one side of the said housing.

The housing type golf simulation apparatus which is the present invention features the installation in the front of the said housing so that the said monitor built in the said monitor installation section can be protected from the hit golf ball and include additional protection means of the monitor with a flood material to watch the screen on the said monitor.

The housing type golf simulation apparatus which is the present invention features that it has a protection plate for monitor to be installed separately from the front of the said housing so that the said monitor can be protected from the hit golf ball and include additional supporting means to support the protection plate for the said monitor so that the protection plate for the said monitor can be stood up at a required angle.

The housing type golf simulation apparatus which is the present invention features that it is adapted with the accommodation part of the resting body in the front of the said housing as it is separate from the said monitor installation section and that it has a resting groove for housing the kinetic sensor and moreover it includes additional sensor resting body to be haunted in the accommodation section of the said resting body.

The housing type golf simulation apparatus which is the present invention features including additional sensor insert section which is adapted in the front of the said housing as it is separate from the said monitor installation section to insert the kinetic sensor.

The housing type golf simulation apparatus which is the present invention features including additional control means for the monitor slope angle to control the slope angle of the said monitor that can be slanted backward.

The housing type golf simulation apparatus which is the present invention features including additional rain cover to be installed in the said housing to protect the said housing front from raining.

The housing type golf simulation apparatus which is the present invention is adapted with arm haunted group to haunt the arm of the golf ball feeder in the bottom front of the said housing and that it features installing inside space of the said housing and includes the golf ball feeder to feed the golf ball to the outside of the said housing through the said arm haunted group.

The housing type golf simulation apparatus which is the present invention features that the said golf ball feeder has safe arrival ring for the golf ball to be fed; ball detection sensor to output the detection signal by sensing that the golf ball arrives at the said safe arrival ring; control board to output the motor drive signal to drive the motor based on the signal output from the said ball detection sensor; motor to be driven by the motor drive signal output from the said control board; installation of the said arrival ring in the fleet; and rotation arm to feed the golf ball to the outside of the said housing by haunting the said arm haunted group with the rotation according to the drive of the said monitor.

The housing type golf simulation apparatus which is the present invention features storage box keeping golf ball to be fed by the said golf ball feeder as it is equipped in the said housing and that it has additional conveying pipe which is a path to feed the golf ball providing from the said storage box to the said golf ball feeder.

The housing type golf simulation apparatus which is the present invention features a discharger adapted in one end of the said housing and additional cooling means blowing the cooling air to the said discharger as it is equipped in the said inside space.

The housing type golf simulation apparatus which is the present invention features additional inlet available in the other side of the said housing to flow the air in and that includes the heat exchanger to generate the cooling air by exchanging the heat with the air flown in from the said inlet as the said cooling means is equipped in the said inside space.

The housing type golf simulation apparatus which is the present invention features discharger adapted in one end of the said housing and that includes additional heating means to feed the warm air generated to the said discharger as it is equipped in the said inside space.

The housing type golf simulation apparatus which is the present invention features that the said golf simulation computer is to extract the function for the current play condition based on the kinetic data of the golf ball to be input from the kinetic sensor; a gift ticket discharge signal is output if the function for the current play condition is corresponded to the function for the play condition to present the gift ticket which becomes a target for presenting the gift ticket; additional discharger for the gift ticket to discharge the gift ticket is included if the discharge signal for the gift ticket is received from the said golf simulation computer as it is equipped inside space of the said housing; and the discharger of the gift ticket is available in the front of the said housing so that the gift ticket discharged from the discharger of the said gift ticket is discharged to the outside of the said housing.

The housing type golf simulation apparatus which is the present invention features that the said golf simulation computer is to extract the function for the current play condition based on the kinetic data of the golf ball to be input from the kinetic sensor; a giveaway discharge signal is output if the function for the current play condition is corresponded to the function for the play condition to present the giveaway which becomes a target for presenting the giveaway; and additional discharger for the giveaway to discharge the giveaway is included if the discharge signal for the giveaway is received from the said golf simulation computer as it is equipped inside space of the said housing.

The housing type golf simulation apparatus which is the present invention features including additional tee mat for using as a swing unit for player if it is unfolded while protecting the said monitor by covering if it is folded as the golf tee is installed and it is installed to be rotated in the front lower side of the said housing.

The housing type golf simulation apparatus which is the present invention includes the additional projector to scan the image data to be transmitted from the said golf simulation computer to the screen as it is equipped in the said housing and that the said golf simulation computer features the output of the kinetic flying image data of the golf ball by means of the said projector.

The housing type golf simulation apparatus which is the present invention with the same structure as above has the following effects:

1. The monitor can be protected from the golf ball swing as the monitor, kinetic sensor and simulation computer are equipped in the housing and also the installation and maintenance of the operation are easy since it is composed in an integrated module to help get better moving and convenience. Moreover, the monitor will not fall down or drop down and this is different from the conventional one. As the monitor is put into the front of the housing, it has effect to enhance the user's using condition by providing the player with the psychological stability.

2. It has effect to improve the play conditions since the player can watch the monitor in the most convenient stance as the monitor installation section is available so that the monitor can be installed at a slant against the vertical direction.

3. It has effect to watch the monitor in the most convenient stance without requiring to turn or raise the player's head consciously because the monitor is positioned in the same visual field zone as the golf ball put on the golf tee so that the bottom part of the monitor installation section is adapted to be adjacent to the golf tee and/or the difference between the height of the bottom part of the monitor installation section and the height of the golf tee should be available within the required value.

4. It has effect to prevent the monitor from being damaged or broken even when impact is given to the monitor as the hit golf ball is dispersed since the flood door was adopted.

5. It has effect to hang the golf club in a convenient, safe and stable way as the structure and inside of the club hanging rack is adapted in a unique slope plane style.

6. It has effect to save the installation cost of the simulation indoor golf practice court as the installation of an extra partition for swing box is not required by using the housing of this invention as a partition of the swing box as well.

7. It has effect to prevent the monitor from being damaged or broken even when impact is given to the monitor as the hit golf ball is dispersed due to a monitor protection means adopted.

8. It has effect to improve the user's use condition since the monitor protection board can be installed optionally if necessary as it can be stood up for installation by separating from the front of the housing which is not mounted in a built-in housing type, so that the monitor can be protected by adopting such structure that the monitor protection board is installed separately from the monitor installed in the housing.

9. It has effect to install different sensors in the housing.

10. It has effect to control the angle of the monitor due to simple structure.

11. It has effect to block raining into the golf simulation apparatus at the front of golf practice court when the golf simulation apparatus is installed in the golf practice court.

12. It has effect to feed the golf ball conveniently as the golf ball feeder to feed the golf ball automatically is built in the housing.

13. It has effect to feed the golf ball to the golf ball feeder in an efficient and convenient way and optionally if necessary as the storage box to keep the golf ball is available in the housing as a detachable type.

14. It has effect to feed the golf ball which is kept in the storage box to the golf ball feeder automatically through the conveying pipe when the storage box is installed hanging in the housing. It also has effect to block feeding the golf ball to the conveying pipe automatically by closing the outlet of the storage box automatically if the storage box is removed from the housing.

15. It has effect to send the cooling or warm air to the player who plays at the swing box in the person-to-person individual custom way at the nearest position having adopted such structure that the cooling or warm air generated from HVAC is directly blown to the player who is at the swing box through the discharger as HVAC system is equipped inside the housing.

16. It has effect to save the maintenance cost of the golf practice court due to saving the cooling and heating energy as the cooling and heating efficiency can be enhanced and moreover cooling or heating is not required at where it is not necessary by blowing the cooling or heating air directly to the player who plays at the swing box at the nearest distance.

17. It has effect to provide the gift ticket to the player by discharging it to the housing in case of a specific play such as continuous buddy, eagle, hole-in-one, etc.

18. It has effect to provide the gift to the player by discharging it to the housing in case of a specific play such as continuous buddy, eagle, hole-in-one, etc.

19. It has effect to provide difference sizes tee mat to meet the play requirements as the monitor can be protected in case of folding while using it as a swing box for player in case of unfolding or the tee mat can be folded in a multi-layer as a multi segmental mat by installing to have the tee mat with the golf tee rotated in the housing.

20. It has effect to scan the optimal image to the screen depending on the distance by approaching or move back the projector to/from the screen depending on the screen size as the distance between the screen and the projector can be controlled and since the projector's position can be changed freely by installing the projector in the movable projector.

21. The golf simulation image can be output by selecting either screen or monitor and especially it is good for the user to determine whether it can be output to monitor or screen.

Figure 1:
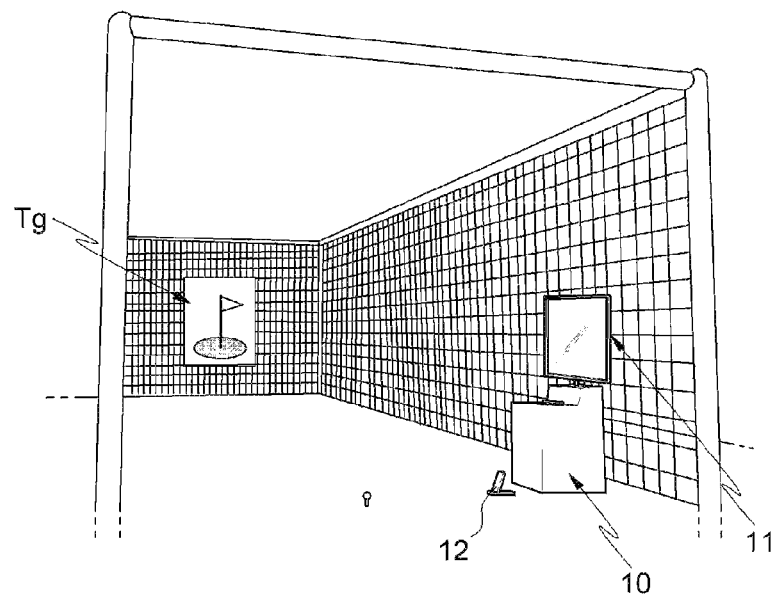
FIG. 1 illustrates the use condition of the golf simulation apparatus by conventional technology.
Figure 2:
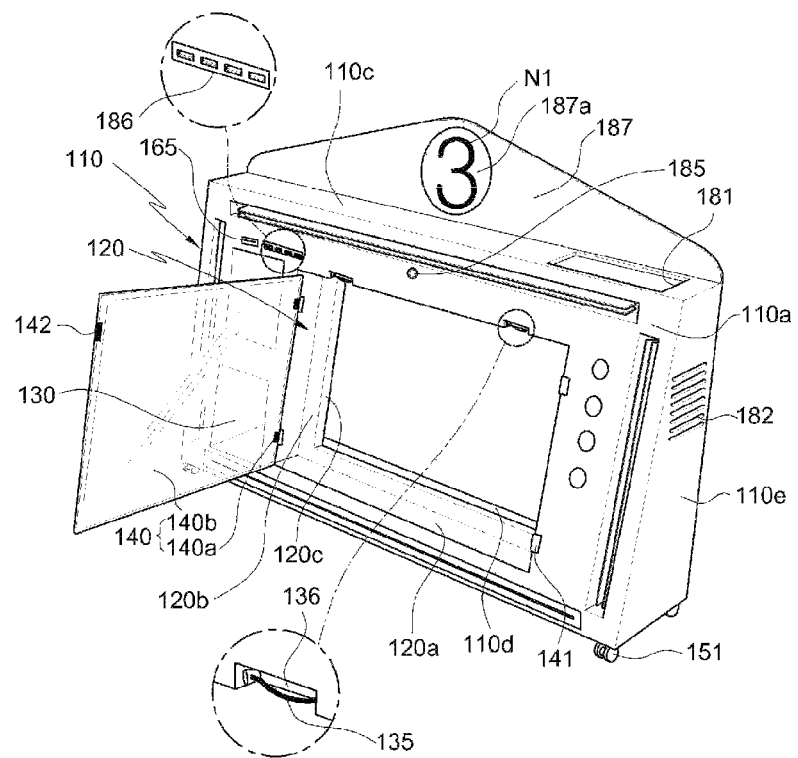
FIG. 2 is a perspective illustration of the housing type golf simulation apparatus in one embodiment of the present invention.

*DESCRIPTION ON NUMERALS*
A: Housing type golf simulation apparatus by the present invention

| | |
|---|---|
| 110: Housing | 110a: Front |
| 110b: Rear side | 110c: Upper side |
| 110d: Lower side | 110e: Left and right side |
| 111: Passing group | 112: Arm haunting group |
| 113a: Stop doljo | 114: Hanger hole |
| 115: Discharger for gift ticket | 116: Discharger for the giveaway |
| 117: Exposing group | S: Internal space |
| 120: Monitor installation section | |
| 120a: Bottom part of the monitor installation section | |
| 120b: Rear support section in the monitor installation section | |
| 120c: Communication hole | |
| 121: Hinge | 122: Tilt support means |
| 122a: Nut | 122a': screw hole |
| 122b: Operating rod screw | 123a: Support portion |
| 123b: Buffer | 124: The support inclination adjustment means |
| 124a: Rotation means | 124b: Rotational screw rod |
| 124c': Screw hole | 124c: Moving plate |
| 124d: Support bar | 130: Sensor mounting section |
| 131: The receiving part for seating | |
| 132, 133: Sensor insertion portion | |
| K: Sensor seating | Ka: Seating hole |
| 135: Elastic pressing member | |
| 135a: Retaining pin | |
| 135b: Tangier | |
| 136: Installation hole | |
| 140: Flood door | 140a: Hinge |
| 140b: Flood panel | 141: Magnetic |
| 142: Metal pieces | 144: Monitor protection means |
| 144a: Bolts | 144b: Coupling hole |
| 145: The first support member | 151: Caster |
| 152: Illuminating means | 153: Rain shield |
| 153a: Lateral membrane | 153b: Upper membrane |
| 161: Club hook | 161a: Inclined surface |
| 162: Advertisement sheet | 163: Seat fixture |
| 165: Bills inlet port | 170: Discharger |
| 171: Air guide | 172: Air inlet |
| 181: Keyboard mounted unit | 182: Louver |
| 185: Camera | 186: USB port |
| 187: Decorative member | 187a: Plate number display |
| 191: Tee mat | 191-1, 192-2: Segmental mat |
| 191a: The first insert | 191b: Sensor mounting hole |
| 191c, 191c': Hinge | 191d: Link |
| 192: Base plate | 194: Base |
| 194a: Support | 194a': The $2^{nd}$ insert hole |
| 201: Golf simulation computer | |
| 205, 206: Service mode selection unit | |
| 205a: Gift ticket present mode selection button | |
| 205b: Normal mode selection button | |
| 206a: Giveaway present mode selection button | |
| 206b: Normal mode selection button | |
| 207: Output mode selection unit | 207a: Monitor output selection button |
| 207b: Screen output selection button | 210: Monitor |
| 210a: Front of the monitor | 210b: Lower part of the monitor |
| 211: Stereoscopic polarizing film | 220, 220', 220": Kinetic sensor |
| 220-1: Sensor module | 225: Projector |
| 250: Golf ball feeder | 250a: Feeder base |
| 251: Motor | 252a: Motor pulley |
| 252b: Belt | 252c: Arm pulley |
| 252c': Rotating arm pulley | 252d: Rotation plate |

| | |
|---|---|
| *DESCRIPTION ON NUMERALS* | |
| A: Housing type golf simulation apparatus by the present invention | |
| 253: Rotation arm | 254: Seating ring |
| 255: Ball detection sensor | 256: Arm rotation sensor |
| 257: Arm rotation sensor | 258: Feeder guide rail |
| 260: Storage box | 260a: Front storage box |
| 262: Outlet | 262': Outlet plate |
| 264: Slide guide hole | 264a: Hollow hole |
| 266: Shutter | 266a: Open doljo |
| 268: Storage rack | 269: Storage rail |
| 270: Gift ticket discharger | |
| 270a: Outlet of gift ticket discharger | |
| 281: Heat exchanger | 282: Blower |
| 283: Heating means | 284: Reflector |
| 290: Giveaway discharger | 230: Keyboard |
| Dr: Door | E1: Place unit |
| Br: Conveying pipe | P: Golf practice court |
| Po: Outdoor golf practice court | R: Roof for outdoor golf practice court |
| Tg: Target membrane | C1: Golf club |
| b1: Golf ball | N1: Swing box number |
| T: Golf tee | hh1: Height of golf tee |
| h2: Bottom height | g-1: Gift ticket |
| g: Giveaway | G: Giveaway keeping group |

DETAILED DESCRIPTION OF THE INVENTION

The followings are the detailed description with attached Figures including desirable embodiments of the housing type golf simulation apparatus.

To define the direction to be used in this specification, the front is the direction where the player is, and the rear, opposite to the front, is referred to as the direction from the front side (110a) to the back side (110b), while the upper is referred to as the direction from the base (110d) to the top (110c). The down direction is the opposite direction of the upper direction and it is used for the same meaning of the present invention entirely.

As shown in FIG. 1 through 6, one embodiment of present invention of housing type golf simulation apparatus (A) features that the system consists of a front side (110a), back side (110b), top (110c), base (110d), left side and right side (110e), inside which there is a space (S) formed where golf simulation computers are installed, which is called as housing (110), a monitor installation space (120) concave from the front side (110a) of the said housing (110) to the direction of rear so that the monitor (210) can be installed without projecting from the front side (110a) of said housing (110), a golf simulation computer which receives the kinetic data including golf ball flying trace and speed detected by a kinetic sensor (220), installed inside the said inner space (S) and, based on it, runs a 3D golf simulation program to display the flying trace of golf ball in video, and a monitor (210) installed inside the said monitor installation space (120).

The said inner space (S) is formed at the rear of monitor installation space (120) and so the golf simulation computer is placed at the rear to the monitor (210).

According to the said adaptation, the monitor (210) and simulation computer are equipped inside the same housing (110) to have the monitor (210) well protected against the hit of golf ball, and overall simulation system is integrated as one module, which provides easy installation, operation and maintenance, and improved easy moving and convenience as well.

In addition, it has the advantage that there is no risk that monitor (210) falls or falls down like existing models, and letting the players to feel easy since the monitor (210) is installed inside the front side of the housing (110).

The housing type golf simulation apparatus (A) in one embodiment of the present invention features that the said monitor installation section (120) consists of the bottom (120a) on which the base of monitor (210) is placed and a backside support (120b) that supports the backside (the numeral not indicated) of the monitor (210) and extends upward from the said floor section (120a), and the said backside support (120b) featuring to form an defined angle of inclination (e) to the rear to the vertical plane.

Because the backside support (120b) is formed with an angle of inclination, the monitor (210) is also installed with a slight tilt to the rear so that the players can view them easily.

The housing type golf simulation apparatus (A) in one embodiment of the present invention features that the said monitor installation section (120) is formed inside said housing (110) in such a way that the said monitor (210) comes into the same visual field zone as the golf Tee.

In case the bottom (120a) of the monitor installation section (120) has a height (h2) similar to that of golf T, or the difference (h1−h2 or h2−h1) is approx. less than 30 cm, the monitor (210) will be located inside the field of vision the same as golf T.

Figure 5:
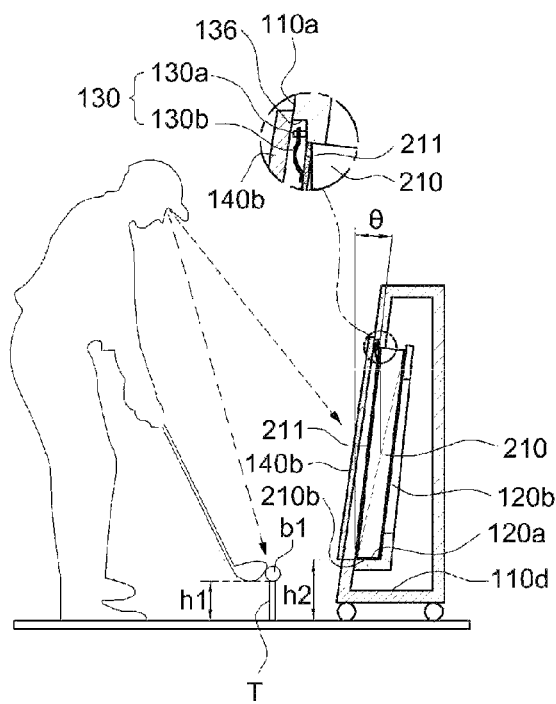
FIG. 5 is the transverse cross section and the use condition of the housing type golf simulation apparatus in one embodiment of the present invention.
Figure 9:
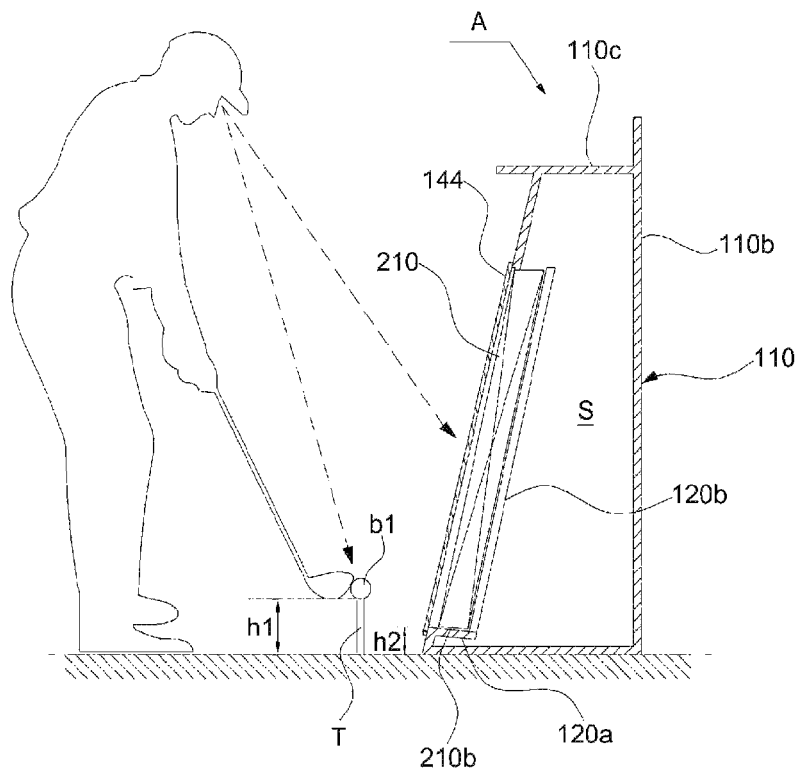
FIG. 9 is a combined sectional view and the use condition view of FIG. 8.

For instance, as illustrated in FIG. 5, in case the height (h1) of the bottom (120a) of monitor installation section (120) is greater than that of golf T, or even the height (h2) of the floor (120a) of monitor installation section (120) is less than that of golf T as shown in FIG. 9, the monitor (210) and golf T will come into the same field of visions if the difference is about less than 30 cm.

Generally, golf players droop down their upper body slightly for putting or tee shot. At the time, the players need not turn or raise their head and can view the monitor (210) in the easiest gesture as well illustrated in FIG. 5 with such configuration of the monitor installation section (120) [the backside support (120b) is tilted for a defined angle and the monitor (210) and golf T is in the same field of vision] and improved players' user environment is provided.

The housing type golf simulation apparatus (A) in one embodiment of the present invention features that there is a communication hole (120c) in the center of the said backside support (120b) to provide a channel between the inner space (S) and monitor installation section (120) of the said housing (110).

According to the above communication hole (120c), it has the advantage that the heat generated from the monitor (210) can be well radiated.

The housing type golf simulation apparatus (A) in one embodiment of the present invention features that it includes and adapts additional kinetic sensor (220) to be installed in the said sensor installation section (130) and the sensor installation section (130) formed in the front (110a) of the said housing (110) as it is separate from the said monitor installation section (120) so that the kinetic sensor (220) can be installed.

The said sensor installation section (130) may adapt in different shapes according to the type of the kinetic sensor and it is again described hereunder.

The housing type golf simulation apparatus (A) in one embodiment of the present invention features that the monitor installation section (120) is designed as can be open and closed for protection of the monitor (210) and, even in case that's closed, players can view the screen of monitor (210) installed inside said monitor installation section (120) because the flood door (140) is included.

The said flood door (140) consists of the hinges (140a) attached on the front side (110a) of the housing (110) and the flood panel (140b) and the said flood panel (140b) is made of reinforced glass or reinforced acryl material and so on, which are transparent and impact resistant.

According to the said adaptation, it has the advantage that, for example, the monitor (210) can be protected against impact of the golf ball dispersed.

The housing type golf simulation apparatus (A) in one embodiment of the present invention features that it includes and adapts additional keyboard (230) that is seated at the keyboard place section (181).

And, in the housing type golf simulation apparatus (A) in one embodiment of the present invention, the golf simulation computer features to be built in the monitor (210). Therefore, the monitor (210) is a computer built-in monitor (210) where a golf simulation computer is built in.

The housing type golf simulation apparatus (A) in one embodiment of the present invention features that it includes and adapts more than one hanger rack (161) for golf club (C1) on one end of the said housing (110).

With such arrangement, players who do the simulation golf practice can store their golf club (C1) by hanging on the hangers (161) and there is no need for otherwise golf club storage place for their golf club (C1) and thus space is saved and utility of golf practice court is increased. In addition, the golf players who desire to change their golf club (C1) need not go to the golf club storage place to take but only take it just right from the golf club hanger rack (161) and so it has the advantage that it can improve the user's convenience for use.

Figure 3:
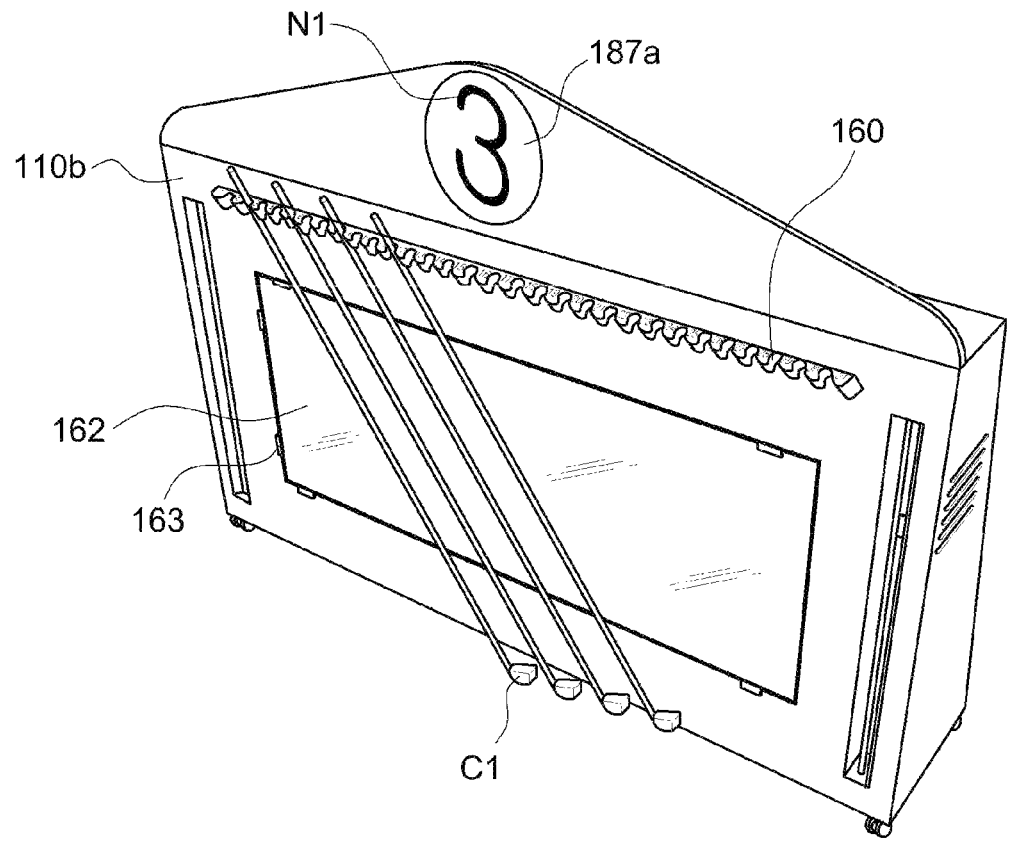
FIG. 3 is a rear perspective illustration of the housing type golf simulation apparatus in one embodiment of the present invention.
Figure 4:
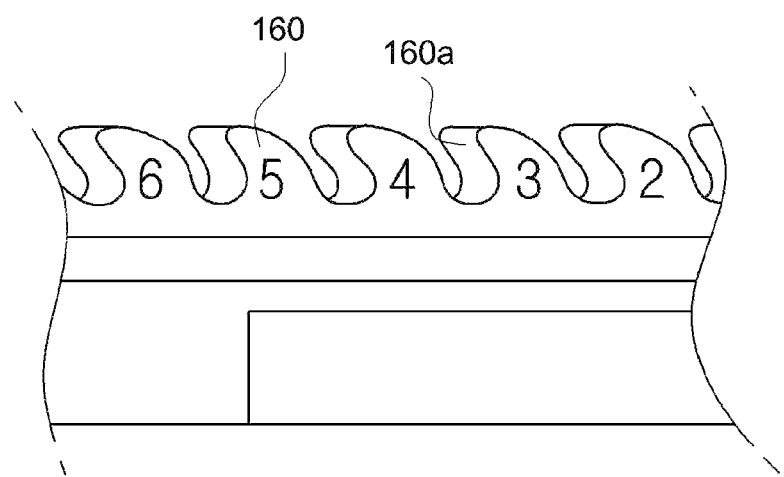
FIG. 4 is a fractional plan view of the club hanging part in the FIG. 3.

The inside of said golf club hanger rack (161) is formed with the inclined surface (161a) downward as well shown in FIGS. 3 and 4 and thus golf club (C1) is hung in inclination by the inclined surface (161a) and especially players need not intentionally hang their golf club (C1) up onto the golf club hanger (161) by tilting but they just hang up their golf club (C1) and it inclines by itself due to the structure of the inclined surface (161a) that is the advantage.

In case golf club (C1) is hung perpendicularly to the floor it will be higher than the housing (110), there is a problem that, when a golf player swings, the golf club (C1) may hit the golf club (C1) hung. However, our invention with golf club hanger rack (161) with the said inclined surface (161a) has solved such problem.

And, multiple golf club hanger rack (161) features a number matching to golf club (C1) is allotted to each golf club hanger (161).

The housing type golf simulation apparatus (A) in one embodiment of the present invention features that one side of monitor (210) is fixed at the front side (110a) of said housing (110) and its other side is pressed down by an elastic member (135) to support the monitor (210) which is mounted inside the monitor installation section (120) so that the monitor (210) mounted inside the monitor installation section (120) will not fall down toward the front side, or move or roll when the monitor (210) is moved being mounted inside the monitor installation section (120).

In the housing (110) in one embodiment of the present invention, it features that the installation groove (136) is formed concave to the front side (110a) of the housing (110), and the said elastic member (135) consists of a set pin (135a) fixed at the installation opening (136) and a rotary elastic tab (135b), which can turn with the said set pin (135a) as the center and remove elastic support of monitor (210) when it gets in to the installation opening (136) while it rotates with said set pin (135a) as the center as it turns out of the installation opening (136) to press the monitor (210) to the rear by elasticity to prevent the monitor (210) from moving or vibrating.

According to the above adaptation, the elastic member (135), which is mounted on the floor (120a) and has its backside being supported by the backside support (120b), presses the upper part of the front of monitor (110a) to support and thus the monitor (210) can be safely moved into place without moving or vibrating.

The present invention also features that it includes a magnet (141) attached to the front side (110a) and a metal piece (142) attached to the front end of the flood door (140), which is attached to the said magnet (141) magnetically.

The housing type golf simulation apparatus (A) in one embodiment of the present invention features that it includes and adapts additional multiple casters (151) attached to the lower part of the said housing (110).

According to the above adaptation, the housing (110) of the present invention features easy moving and carrying, and only one worker can move or carry the housing (110) to that its installation is convenient and thus installation of simulation apparatus has also become convenient and has advantages to solve the problem of limited space.

The housing type golf simulation apparatus (A) in one embodiment of the present invention features the cameras (185) used to shoot the motion of players (C1) and play are installed at the front side (110a) of said housing (110), and including more than one USB port (186) installed on the front side (110a) of the said housing (110) which allow storage of image shot by the said cameras (185) in USB memory (not illustrated).

According to the said adaptation, it has the advantage that players can plug their USB memory in the USB port (186) to store their playing image and take off.

The housing type golf simulation apparatus (A) in one embodiment of the present invention features to include an ads sheet (162) where ads is displayed, which is installed at the back side (110b) of the said housing (110).

The said ads sheet (162) features setting up by the fixture (163) attached to the back side (110b).

The said ads sheet (162) at the back side (110b) features changeable and the back side (110b) can be viewed by the adjacent player from his/her front and thus it has the advantage that ads effect can be improved and ads profits can also be increased since it can be changed.

The housing type golf simulation apparatus (A) in one embodiment of the present invention features to include a bill slot (165) formed at one side of the front side (110a) of the housing (110).

According to the said adaptation, the said bill slot (not illustrated) needs not to be otherwise installed but is installed inside the inner space (S) of the housing (110) of the present invention to improve utilization efficiency of space and in this case, bills can be put into bill receiving device through the said bill slot (165).

In the housing type golf simulation apparatus (A) in one embodiment of the present invention, its top (110c) has a keyboard seating section (181) for placing a keyboard (230) and, at one side of housing (110), there is a heat sink hole (182) formed.

The housing type golf simulation apparatus (A) in one embodiment of the present invention features for using the said housing (110) as swing box partition, swing box number indicator section (187a) is provided at one side of the said housing (110) to indicate the swing box no. (N1) of the golf practice court.

According to the said adaptation, the housing (110) of the present invention can also be used as swing box partition and it has the advantage that no otherwise swing box partition is required and, in the result, the installation cost of simulation golf practice court is decreased.

And, in one embodiment of the present invention, concretely, the said swing box number indicator section (187a) is provided at an interior member (187) projected upward from the top (110c) where a player's belongings can be placed.

Meanwhile, as illustrated in FIG. 5, the surface of monitor (210) is coated with stereoscopic polarizing film (211) by which 3D image can be viewed.

Figure 7:
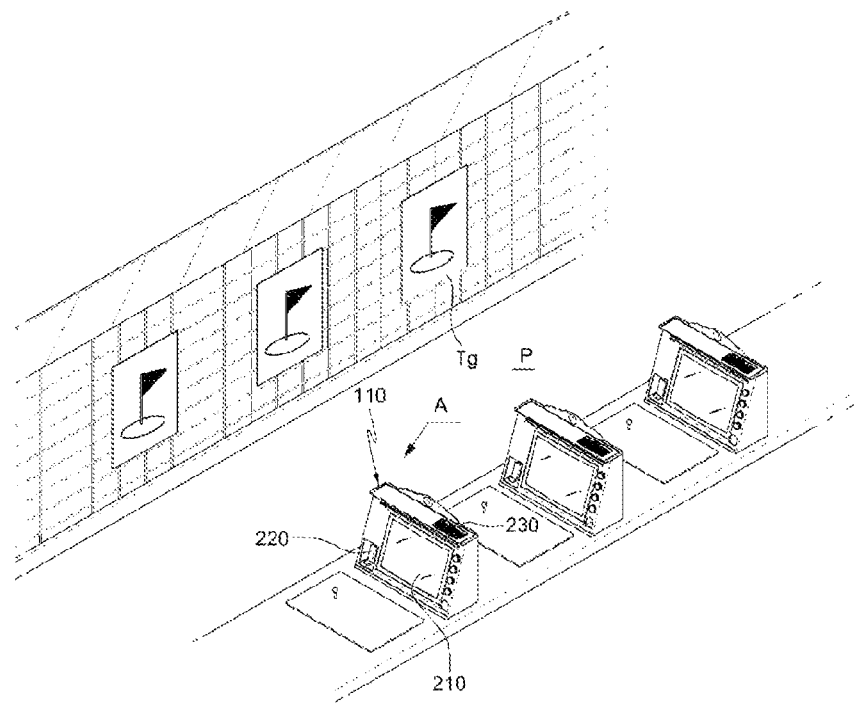
FIG. 7 is the exemplary view of the golf practice court where the housing type golf simulation apparatus was installed in one embodiment of the present invention.

FIG. 7 illustrates an example of a golf practice court (P) equipped with the housing type golf simulation apparatus (A) in one embodiment of the present invention.

As illustrated in FIG. 7, with the golf practice court (P) equipped with the housing type golf simulation apparatus (A) by the present invention, the housing type golf simulation apparatus (A) functions as a swing box partition and is provided for each bat, and includes a target screen (Tg) as a target for hitting golf ball.

The said golf practice court (P) features that the image is displayed immediately on the monitor (210), not project the image through the conventional screen since the golf practice court can implement it anywhere indoor or outdoor.

Figure 8:
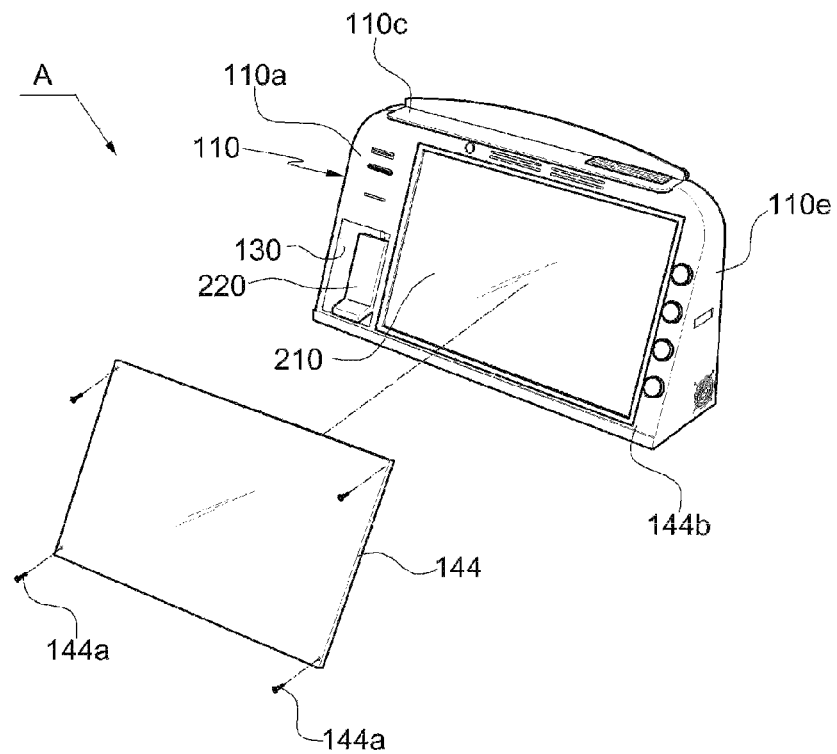
FIG. 8 is a perspective illustration of the portion decomposition for the housing type golf simulation apparatus in other embodiments of the present invention.

As illustrated in FIGS. 8 and 9, the housing type golf simulation apparatus (A) in other embodiments of the present invention features that the monitor (210) installed on the said monitor installation section (120) is placed at the front side (110a) of the said housing (110) to protect against hitting by golf balls and that it includes adapts a transparent material monitor protecting means (144) so that the said monitor (210) screen can be viewed.

Thus, even golf balls hit is dispersed to the monitor (210), the players can easily enjoy the golf simulation game in a safety condition since the monitor protection means (144) is provided.

The said monitor protection means (144) features that it adapts reinforced glass or reinforced plastic.

For mounting the said monitor protection means (144) at the front side (110a), set the fastening bolts (144a) from the bolting holes (144b) formed at the front side (110a).

Figure 10:
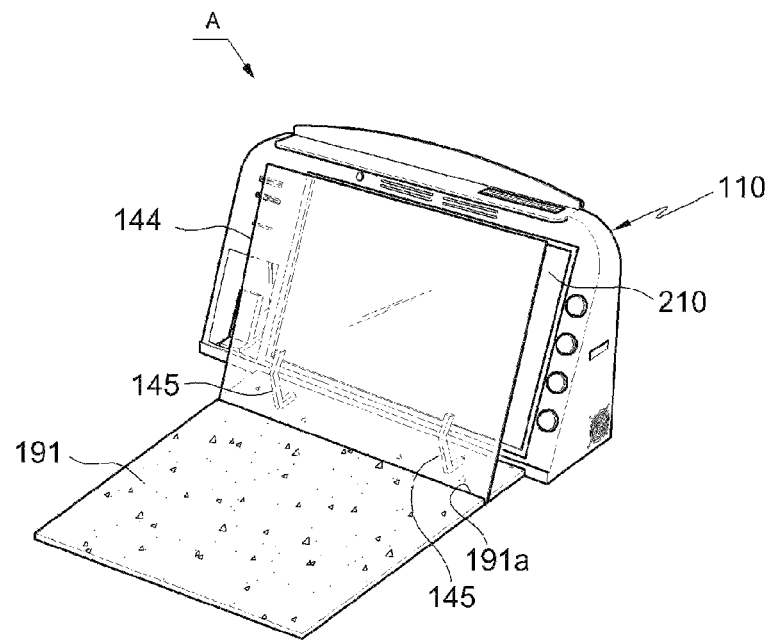
FIG. 10 is a perspective illustration of the housing type golf simulation apparatus in another embodiment of the present invention.
Figure 13:
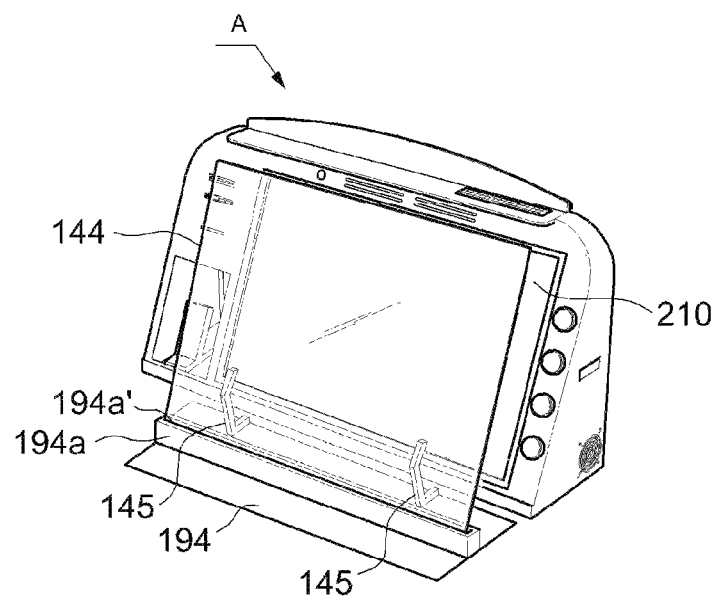
FIG. 13 is a perspective illustration in other modified embodiments of FIG. 10.

The next is description with another embodiment of the present invention based on FIG. 10 and FIG. 13.

As illustrated in the FIGS. 10 and 13, the housing type golf simulation apparatus (A) in other embodiments of the present invention features that it includes and adapts a monitor protector panel (144) realized with transparent material, which is installed with a spacing from the front side (110a) of housing (110) to protect the said monitor (210) from the golf ball (b1) hit and inclined with a defined angle to allow availability to view the monitor (210), and a support means to support the said monitor protector panel (144) to allow the monitor protector panel (144) to be installed at a defined angle.

Figure 11:
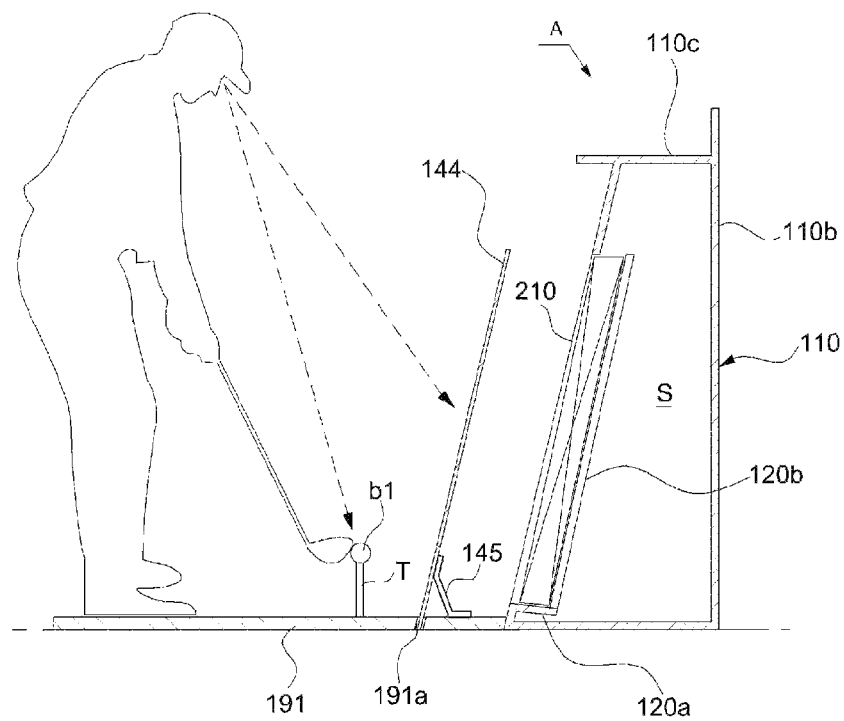
FIG. 11 is a section view and the use condition view of FIG. 10.

As illustrated in FIGS. 10 to 11, the said support means features that it adapts to include a pair of first support members (145) which support the said monitor protector panel (144) by being set on the back side of the said monitor protector panel (144), for instance, such as adhesive or bolting method (not shown).

As described above, it has the advantage that with a pair of the first support members (145), the said monitor protector panel (144) can be set up easily and it is easy to install and remove the monitor protector panel (144).

In addition, as illustrated in the FIG. 10 or FIG. 13, the said support means features that is adapts the second support member which supports the said monitor protector panel (144) by inserting at its lower part.

As illustrated in the FIGS. 10 and 11, the said $2^{nd}$ supporting member features that it adapts the tee mat (191) which is formed with the $1^{st}$ insertion groove (191a) to support by interpolating the lower part of the said monitor shroud (144).

As described above, it forms the $1^{st}$ insertion groove (191a) with the tee mat (191) in the rectilinear style and when the monitor shroud (144) is inserted into the $1^{st}$ insertion groove (191a) the monitor shroud (144) can be supported and additionally if the said $1^{st}$ supporting member (145) is installed the bearing capacity can be reinforced.

Thus, it has the advantage that the production cost can be saved since the existing tee mat can be used without adopting extra members.

As illustrated in FIG. 13, the said $2^{nd}$ supporting member features that it protrudes by extending to the upper direction from the said base (194) and the base (194) that is mounted in the bottom while forming the $2^{nd}$ insertion groove (194a') that can interpolate the lower part of the said monitor shroud (144) so as to be comprised of the support (194a) to support the said monitor shroud (144).

Figure 12:
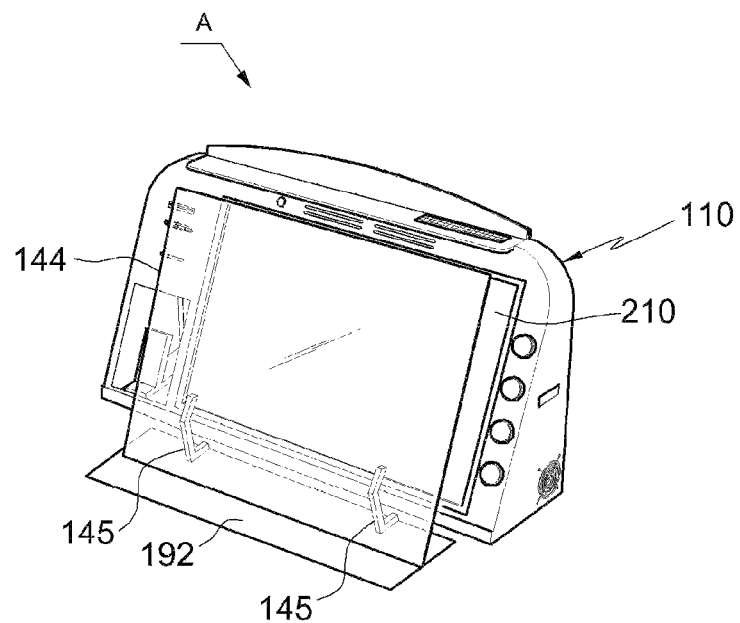
FIG. 12 is a perspective illustration in the modified embodiment of FIG. 10.

Meanwhile, as illustrated in FIG. 12, the said supporting means features that it is comprised of the bending base plate (192) extended to the front and the rear from the lower part of the said monitor shroud (144).

The said base plate (192) can be formed with the monitor shroud (144) to be integrated and it has the advantage that can prevent the monitor shroud (144) from slipping by adapting such materials having large friction as rubber, etc.

Figure 6:
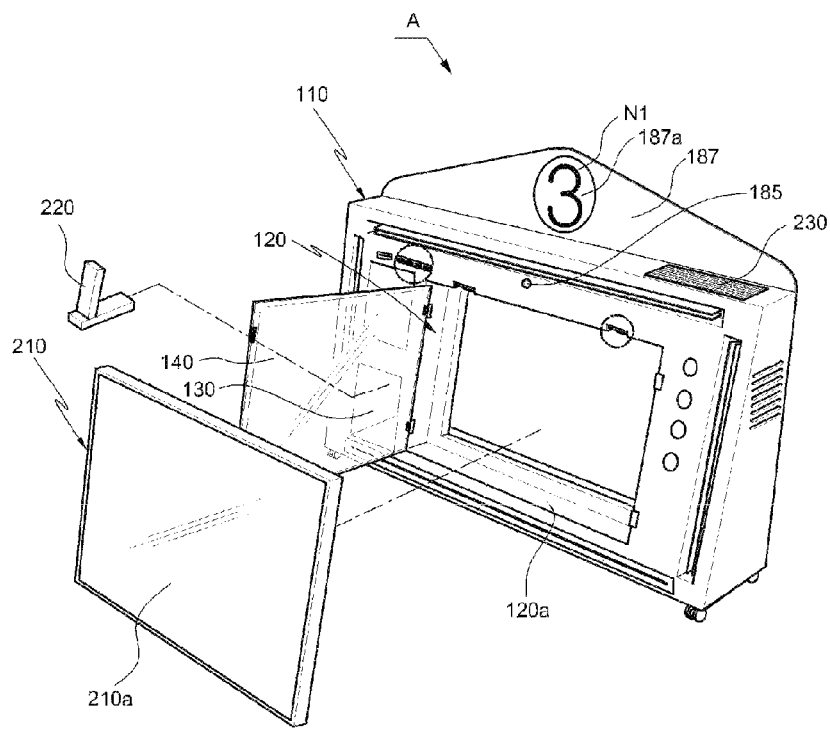
FIG. 6 is a perspective illustration of the portion decomposition for the housing type golf simulation apparatus in one embodiment of the present invention.
Figure 14:
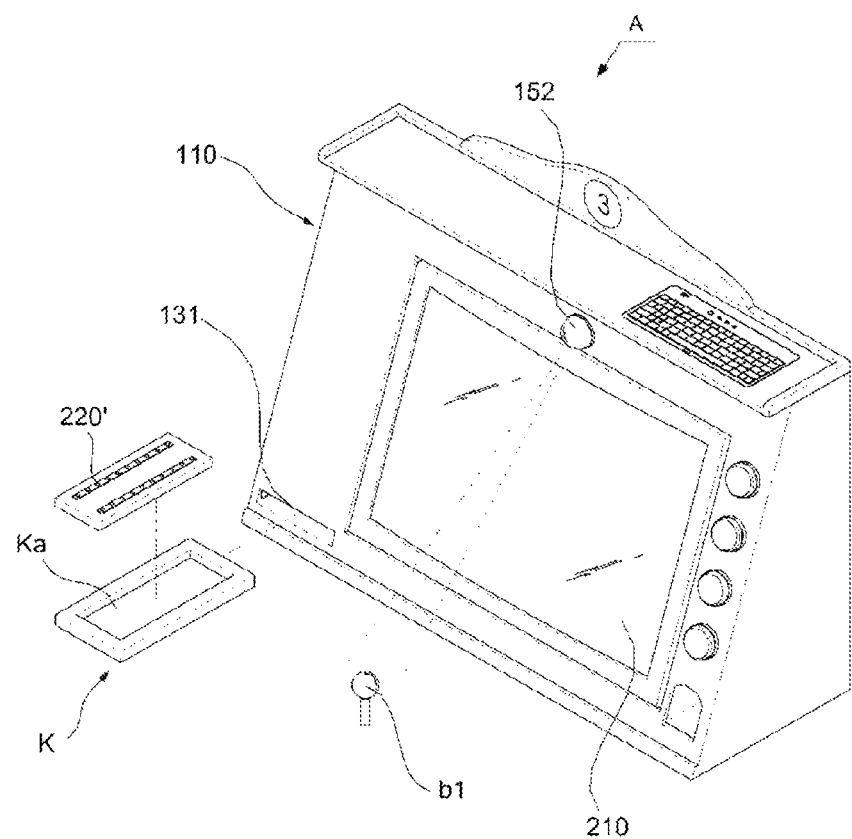
FIG. 14 is a perspective illustration of the portion decomposition of the golf simulation apparatus in another embodiment of the present invention.
Figure 18:
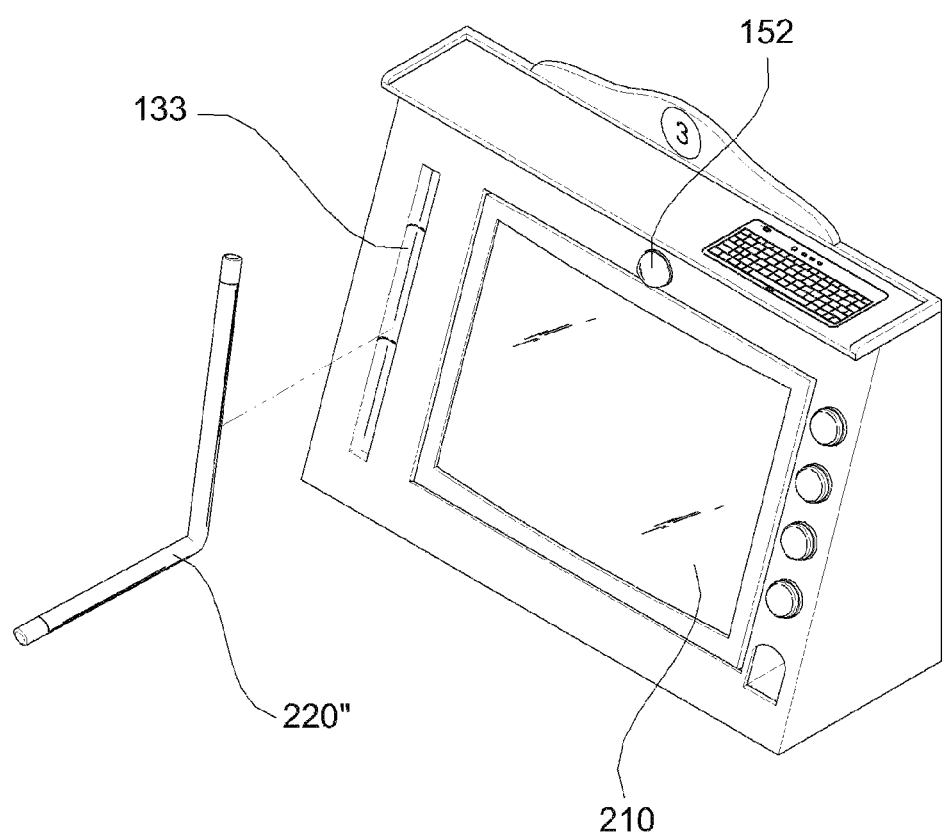

In the golf simulation apparatus by the present invention, the kinetic sensor can have different kinetic sensors in addition to such types illustrated in the said FIG. 6 for which the example is disclosed in FIG. 14 or FIG. 18.

Figure 15:
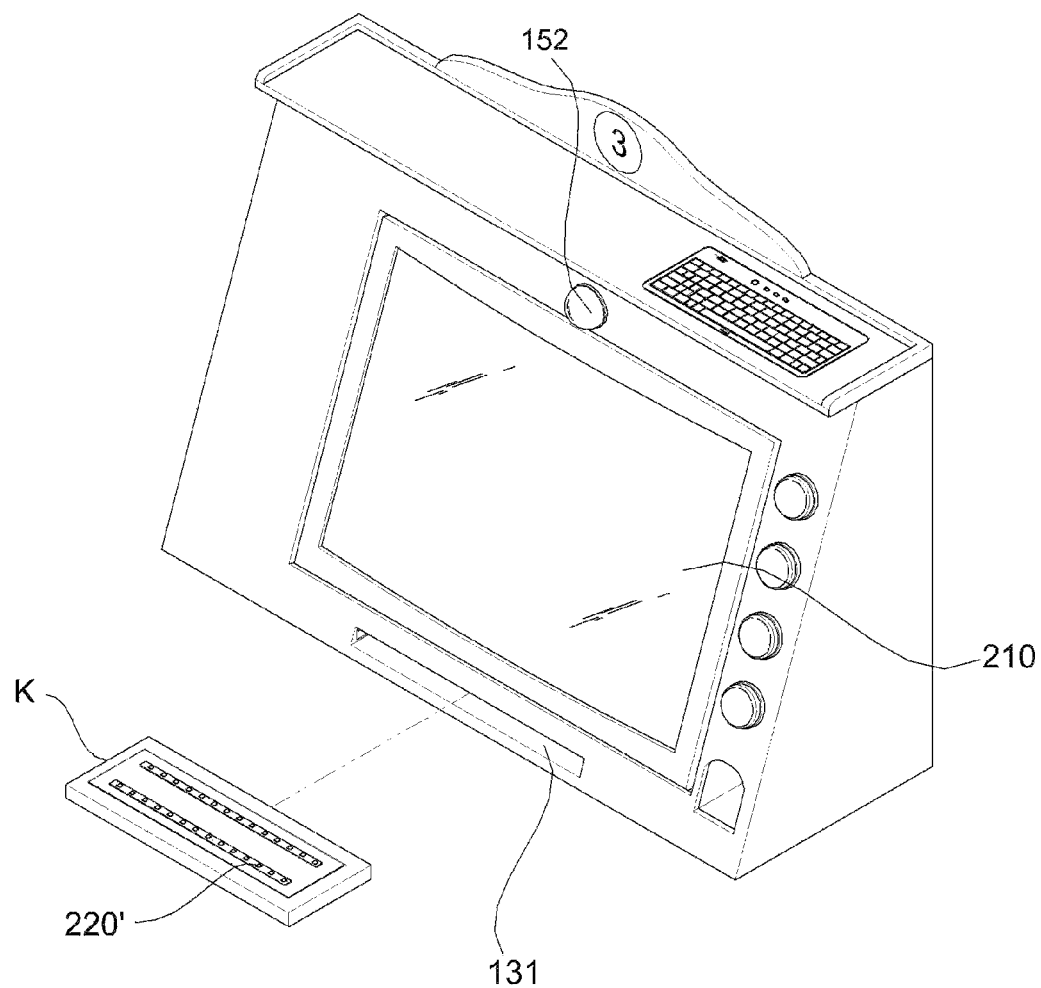
FIG. 15 is a perspective illustration of the portion decomposition in the modified embodiment of FIG. 14.

As illustrated in FIGS. 14 and 15, the golf simulation apparatus in another embodiment of the present invention features that the receiving part is provided in the front (110a) of the said housing (110) since it is separate from the said monitor installation section (120); receiving groove (Ka) is formed so that the kinetic sensor (220') can be seated; and that it includes and adapts additional sensor receiving board (K) to haunt in the said receiving part (131).

The said receiving part (131) is located in the right or left side of the monitor installation section (120) so that the kinetic sensor (220') can be haunted in the length direction as illustrated in FIG. 14, so it can be formed to be a rectangular type in the front and rear direction. It can also formed to be rectangular in the horizontal direction by locating in the below monitor installation section (220') so that the kinetic sensor (220') can be haunted in the horizontal direction crossing at right angles.

Figure 16:
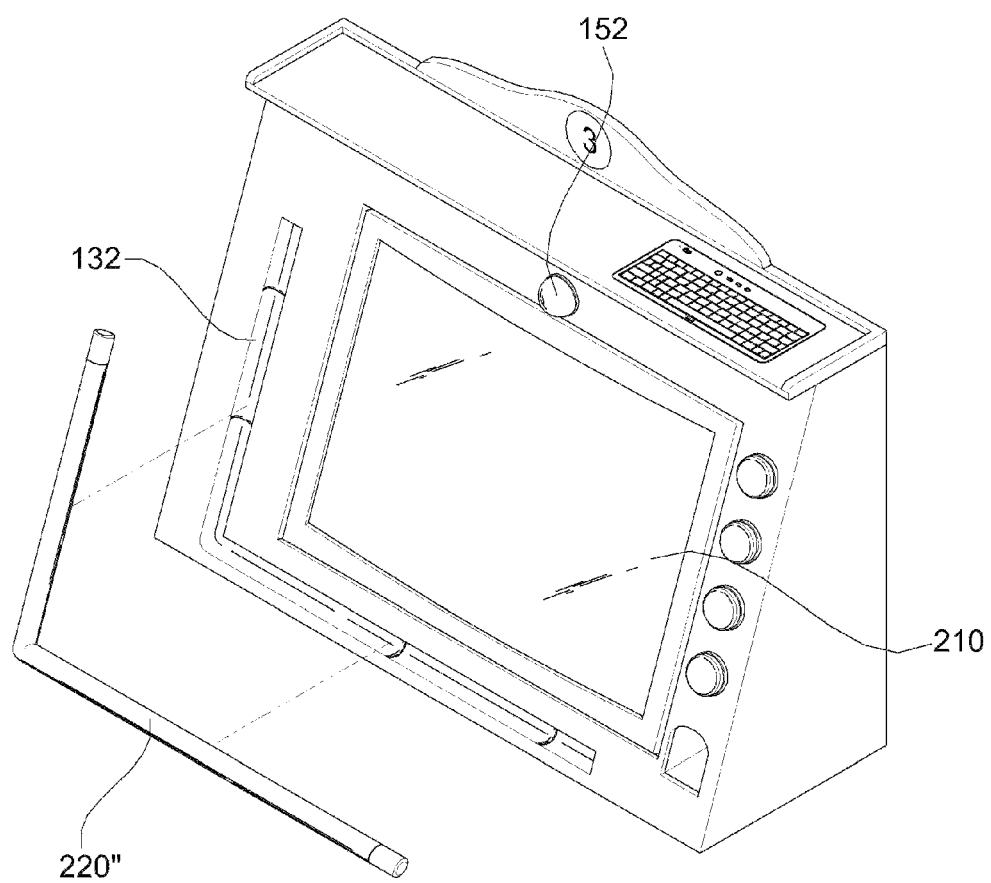
FIG. 16 is a perspective illustration of the portion decomposition of the golf simulation apparatus in another embodiment of the present invention.
Figure 17:
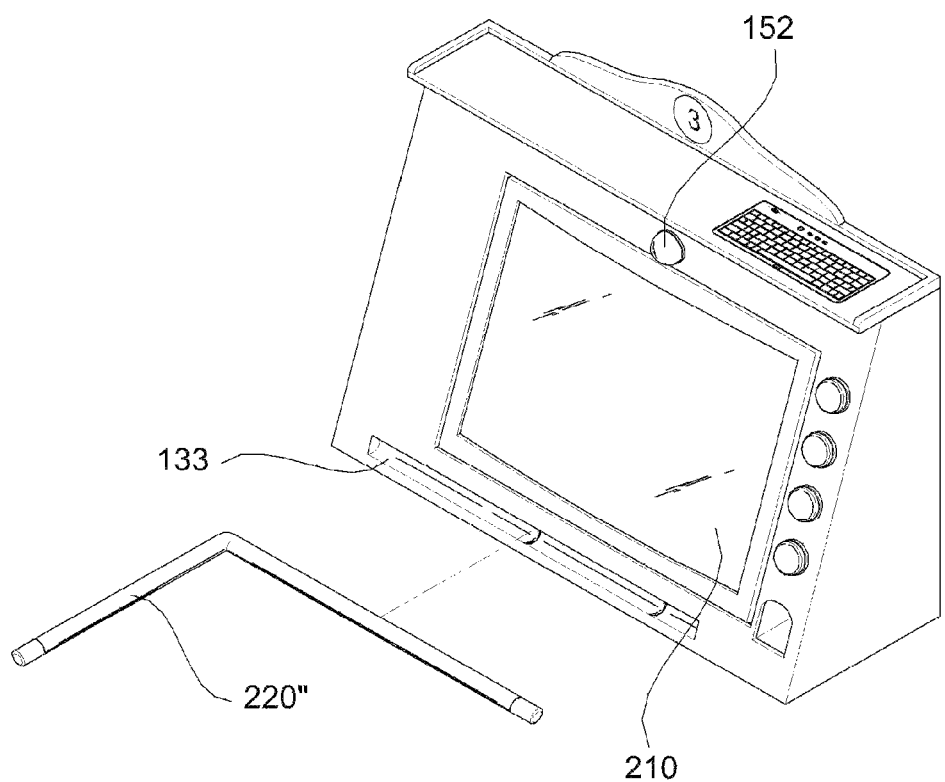
FIGS. 17 and 18 are perspective illustrations of the portion decomposition in the modified embodiment of FIG. 16.

As illustrated in FIG. 16 or 18, the golf simulation device in another embodiment of the present invention features that it includes and adapts the sensor insertion unit (132, 133) provided in the front (110a) of the said housing (110) since it is separate from the monitor installation section (120) so that the kinetic sensor (220") can be inserted.

And the said sensor insertion unit (132, 133) is formed in L type or (–) type and the inner side features having curved so that the said L type or (–) type sensor insertion unit (132, 133) can be spotted with the kinetic sensor (220").

And in the golf simulation apparatus (A) by the present invention, it features including the additional lighting means (142) to provide the illumination at above certain illumination value to operate the kinetic sensor (220, 220', 220") to be provided in one end.

The kinetic sensor (220, 220', 220") has the advantage that the kinetic sensor can recognize the golf ball put on the golf tee efficiently even under the dark conditions by providing illumination means so that the golf tee faces one end of the housing main body as the kinetic sensor is operated at above certain illumination level. Moreover, it has another advantage that can save the energy by preventing the unnecessary energy from being wasted by providing the illumination that can only recognize the golf ball put on the golf tee.

Figure 19:
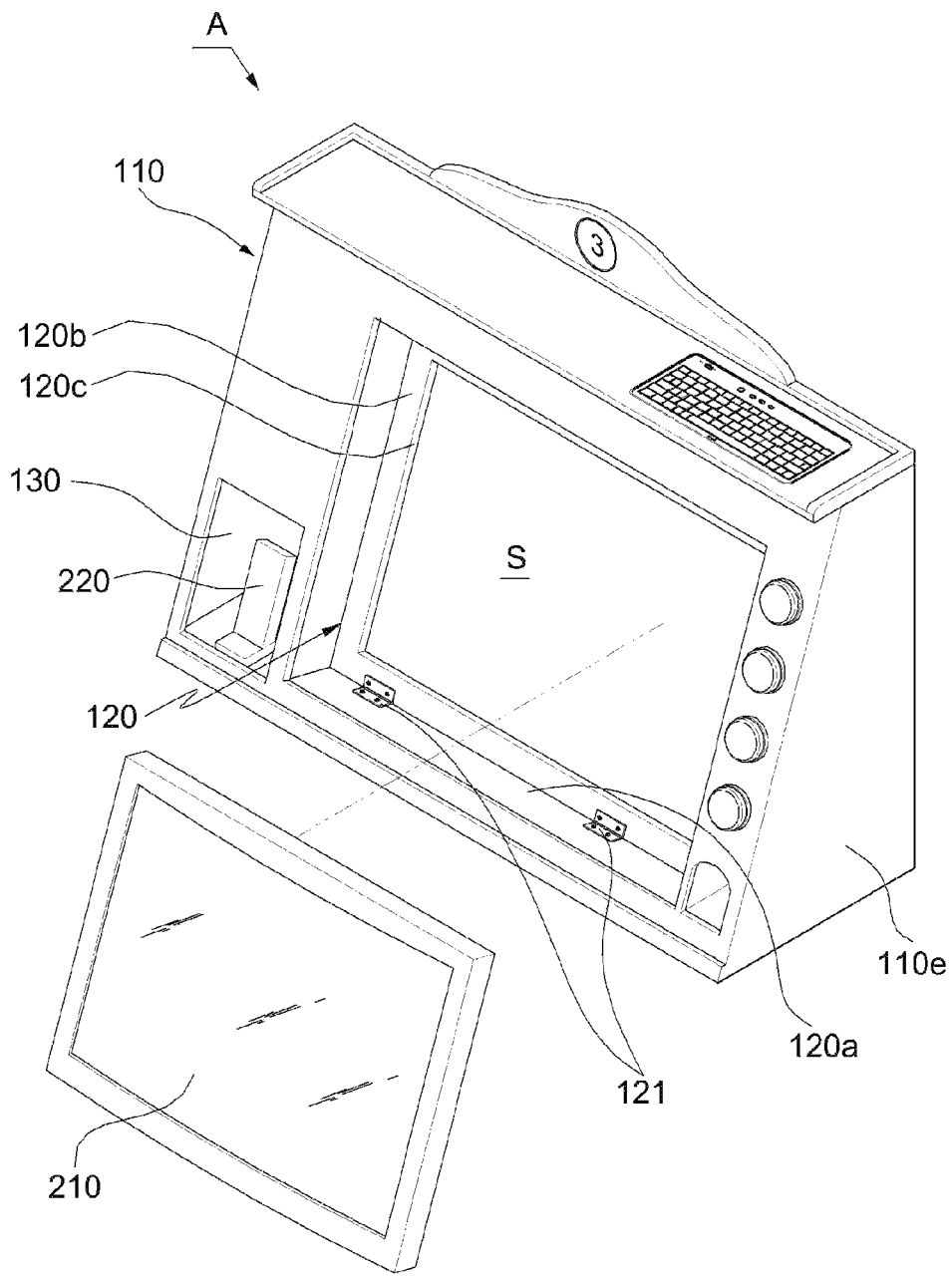
FIG. 19 is a perspective illustration of the housing type golf simulation apparatus in another embodiment of the present invention.
Figure 23:
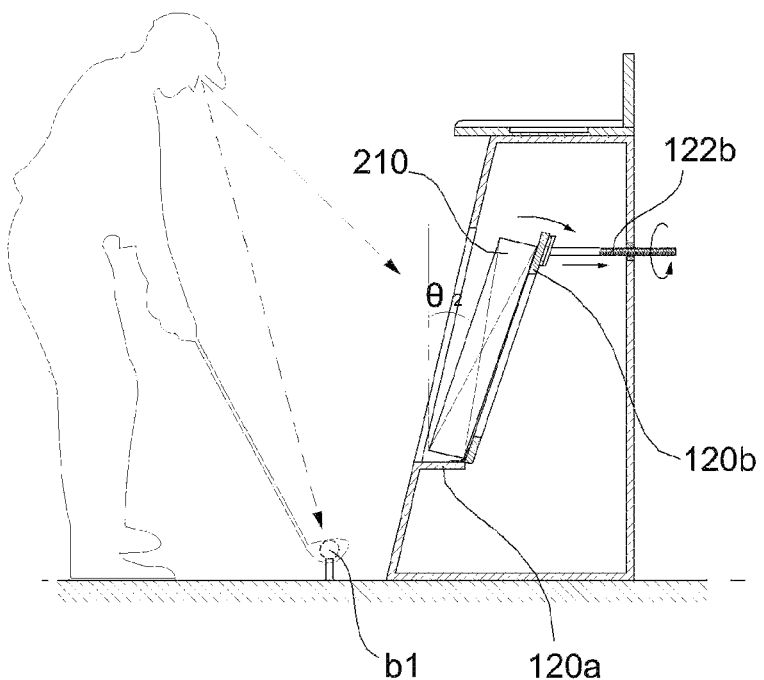

The following is to describe another embodiment of the present invention based on FIG. 19 or 23.

The golf simulation apparatus (A) by the present invention features that it includes and adapts the control means for the slop angle of the monitor to adjust the slope angle that the monitor (210) seated in the said bottom part (120a) and the rear support (120b) is tilted to the rear side.

And the said monitor tilt angle adjusting means is to adapt the support tilt adjustment means (122) to adjust the tilt angle of the monitor (210) by adjusting the tilt angle (0) of the said rear support (120b).

Figure 20:
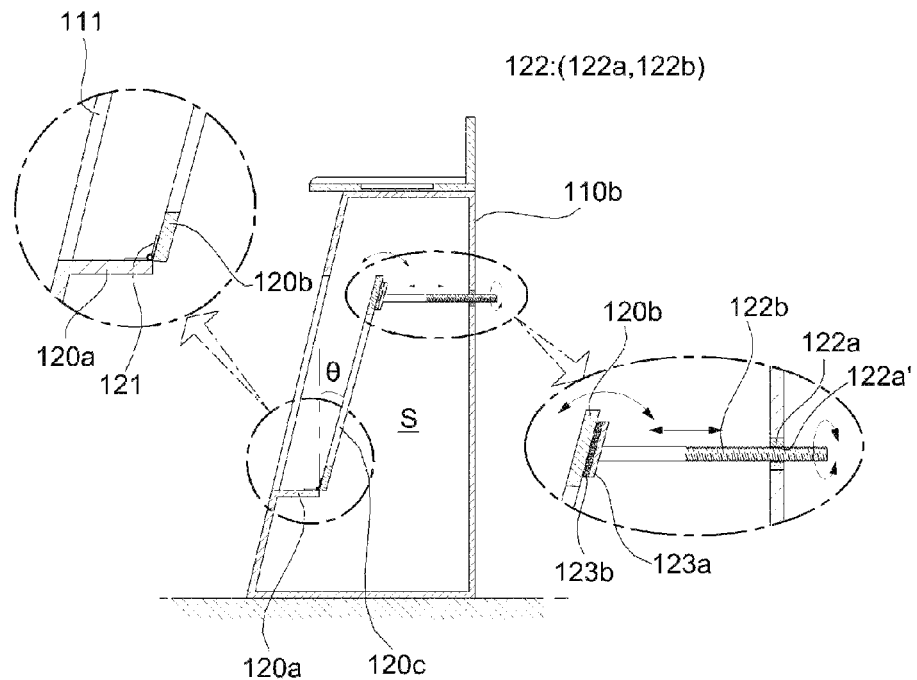
FIG. 20 is the sectional view and the portion enlarged view of FIG. 19.

The said support tilt adjustment means (122) features that screw holes (122a') are formed with the screw groove in the center and in the nut (122a) fixed to provide in the rear side (110b) of the housing (110), there is a screw thread to be engaged with the screw hole (122a') of the said nut (122a) at the inner periphery as illustrated in one end of the said housing (110) (for example FIG. 20); the edge supports the said rear support (120b) and when the outside rotation means (not shown) connected with the training end is rotated it moves forward and backward depending on the rotation of the outside rotation means, so it includes the operation screw rod (122b) to adjust the tilt of the said monitor support (120b).

According to the above structure, the monitor (210) can be provided in a housing (110) to control, use and move in a module and also it has the advantage that can adjust the tilt of the monitor (210) by adjusting the tilt angle of the rear support (120b).

Normally, the installation cost requires a lot as the monitor to be used for the golf simulation apparatus (210) needs complex tilting device to have the monitor (210) itself tilted because of the large size and so heavy weight but this invention has advantage that can save the product cost since the monitor (210) tilting can simply be adjusted by adopting such means to adjust the slope angle of the rear support (120b) in which the rear side of the monitor (210) is supported, not monitor (210) itself.

Moreover, since the player can adjust the tilt of the monitor (210) by adjusting the slope angle of the rear support (120b) to meet his/her play requirements, when the rear support (120b) is tilted backward to meet one's preference, the golf ball (b1) and the monitor (210) will come into the same visual field zone, so the player does not need to raise or turn his/her head to watch the monitor (210) and he/she can watch the monitor (210) in the most convenient stance so therefore it has the advantage that the player's use condition is improved.

Further, in the housing type golf simulation apparatus (A) in one embodiment of the present invention, it is desirable to install in such a way that the rear support (120b) is to be rotated at the bottom part (120a) to adjust the tilt of the said rear support (120b) efficiently.

Then, it can be connected for instance by the hinge (121) so that the rear support (120b) and bottom part (120a) can be rotated.

And there may be an external rotation means to rotate the operation screw rod (122b) in the trailing end of the said operation screw rod (122b) and the said external rotation means is mounted for instance in the training end of the operation screw rod (122b) so as to adapt the lever (non shown) to be grippable by user to rotate the operation screw rod (122b) by force due to the external power, or a motion converter (e.g. pinion and rack) may be adapted to convert the motor rotation into the linear motion as it is connected with the drive motor (not shown) and the said drive motor.

The housing type golf simulation apparatus (A) in one embodiment of the present invention features adapting additional support portion (123a) to support the said rear support part (120b) as the said operation screw rod (122b) is fixed in the edge.

According to the above structure, it has the advantage to make the motion to adjust the slope angle better as the operation screw rod (122b) extends the area to be touched with the rear support (120b).

The housing type golf simulation apparatus (A) in one embodiment of the present invention features that it adapts flexible material and one side is fixed with the said support portion (123a) and that it includes additional buffer (123b) so that the other surface is adhered to the said rear support (120b).

According to the above adaptation, there may have a clearance between the rear support (120b) and the buffer to be adhered (123b) depending on the tilt motion of the rear support (120b), and it has the advantage to prevent such clearance in advance by means of buffering of the buffer (123b) between rear support (120b) and the support portion (123a).

It is desirable that the said buffer (123b) is to adapt such flexible materials as for instance rubber, soft plastic, foam resin, etc.

Figure 21:
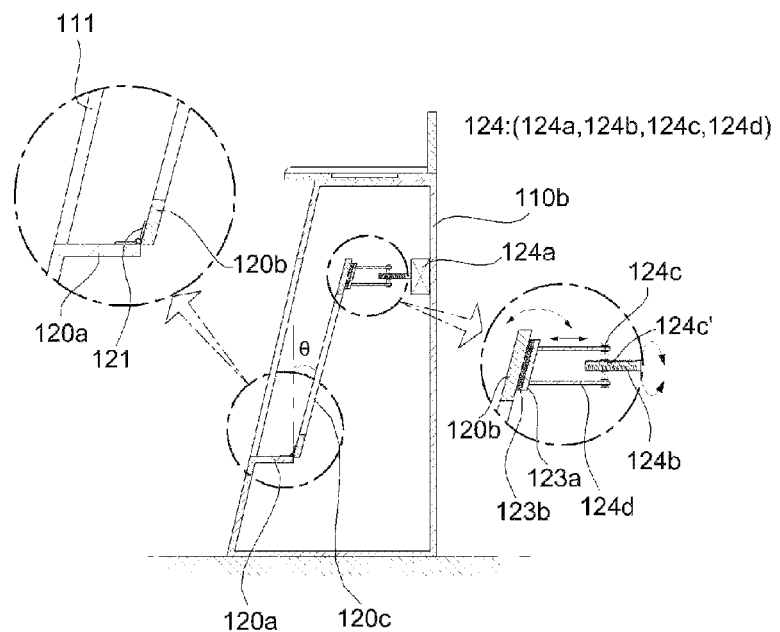
FIG. 21 is the sectional view and the portion enlarged view in the modified embodiment of FIG. 19.
Figure 22:
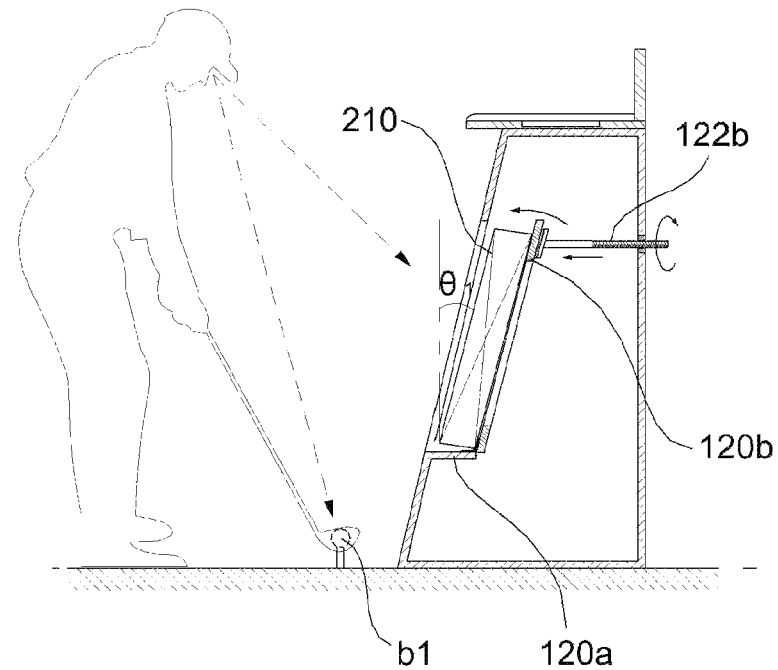
FIGS. 22 and 23 are the operational view in the embodiment of FIG. 19.

As illustrated in FIG. 21, the housing type golf simulation apparatus (A) in other embodiments of the present invention features that the said support slope adjustment means (124) provides rotation means (124a) to be mounted in one end of the said housing (110); rotation screw rod (124b) to be rotated according to the rotation drive of the said rotation means (124a) and the screw holes (124c') formed with the screw groove are provided by passing through; and that it also includes the support bar (124d) which supports the rear support (120b) while facilitating the moving plate (124c) which moves backward/forward according to the rotation of the said rotation screw rod (124b) by engaging the said screw hole (124c') with the said rotation screw rod (124b) and the said moving plate (124c). The said rotation means (124a) may be adapted as e.g. motor.

It describes the operation for tilting the monitor (210).

When the operating screw rod (122b) engaged with the nut (122a) rotates the operating screw rod (122b) to move forward, the operating screw rod (122b) will move forward pushing the rear support (120b).

If the rear support (120b) gets powered forward, the rear support (120b) rotates against the bottom part (120a) counterclockwise and when the rear support (120b) rotates counterclockwise, the monitor (210) which is supported and the rear side is leaned over the rear support (120b) will rotate counterclockwise as well, so the monitor (210) will be standing forward as the inclination angle (01, 02<02) becomes small.

To make the tilted angle of the monitor (210) larger to get much more tilted backward, rotate the operating screw rod (122b) inversely, and then the operating screw rod (122b) pulls back. Then, the monitor (210) and rear support (120b) will rotate clockwise automatically by the self-load and the tilted angle (02) will become larger.

Thus, if the monitor (210) angle is larger, the monitor (210) and the rear support (120b) can be rotated by the self-load, so the rotating operation can be done sufficiently even when it applies less rotation power against the operating screw rod (122b).

Meanwhile, it describes the operation of the housing type golf simulation apparatus (A) in other embodiments of the present invention disclosed in FIG. 21.

When the motor which is the rotation means (124a) is run the rotation screw rod (124b) rotates and if the rotation screw rod (124b) rotates the moving plate (124c) will move forward or pull back according to the motor's rotation direction. The support bar (124d) moves forward or backward when the moving plate (124c) moves forward or backward.

If the support rod (124d) moves forward the rear support (120b) will get powered forward and the rear support (120b) will rotate against the bottom part (120a) counterclockwise. If the rear support (120b) rotates counterclockwise, the monitor will rotate as well counterclockwise, so the inclination angle (01) will become small.

On the contrary, it was mentioned above when the support rod (124d) pulls back, both monitor (210) and rear support (120b) will rotate clockwise by the self-load, so the tilted angle (02) will become larger.

Figure 24:
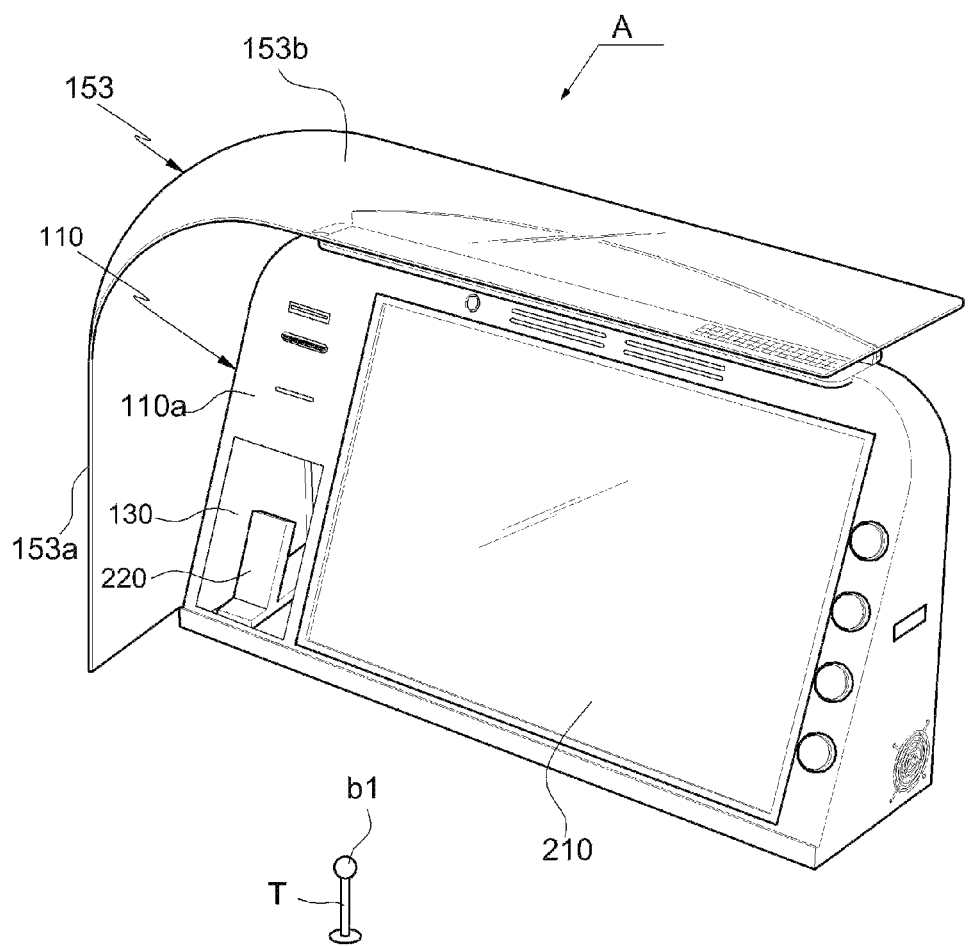
FIG. 24 is a perspective illustration of the housing type golf simulation apparatus with the rain shield.
Figure 25:
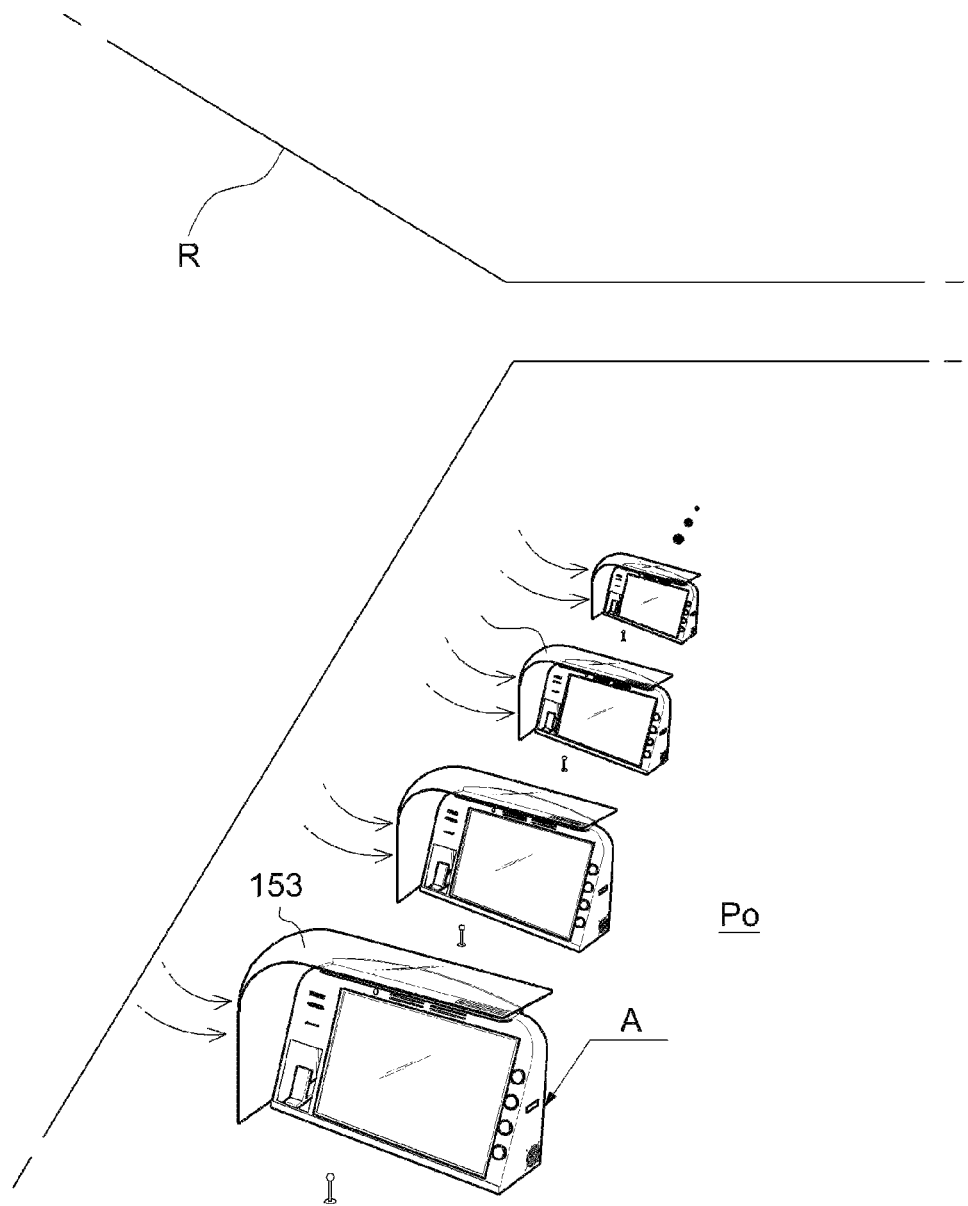
FIG. 25 is a use condition view showing that the golf simulation apparatus in FIG. 24 was installed at the outdoor golf practice court.

The following is to describe another embodiment of the present invention based on FIGS. 24 and 25:

The housing type golf simulation apparatus (A) in one embodiment of the present invention features that it includes and adapts the rain shield (153) to be installed in the said housing (110) so that it can block rain coming into the said front housing (110) (especially monitor (210)).

Thus, it has the advantage to protect the golf simulation apparatus especially monitor (210) since it can block the rain comes into even when the rain comes into the front below roof (R) of the outdoor golf practice court (Po) if the housing type golf simulation apparatus (A) is installed in the outdoor golf practice court (Po).

The housing type golf simulation apparatus (A) in one embodiment of the present invention features that the said rain shield (153) is implemented in roughly 'ㅁ¡' shape and that it adapts the upper membrane (153b) to block the rain coming into the said monitor (210) from the upper direction as it is bent extending from the lateral membrane (153a) to block the rain coming into the said monitor (210) from the lateral direction and the said lateral membrane (153a) since it is installed in the side (110e) of the said housing (110).

Meanwhile, the said rain shield (153) may be mounted in the housing (110) by different known coupling means including bolts and nuts.

The housing type golf simulation apparatus (A) in one embodiment of the present invention features that the lateral membrane (153a) of the said rain shield (153) is installed in the side (110e) where the said sensor installation section (130) is formed so as to block the rain coming into the kinetic sensor (220) installed in the said sensor installation section (130). (Refer to FIGS. 24 and 25.)

Figure 26:
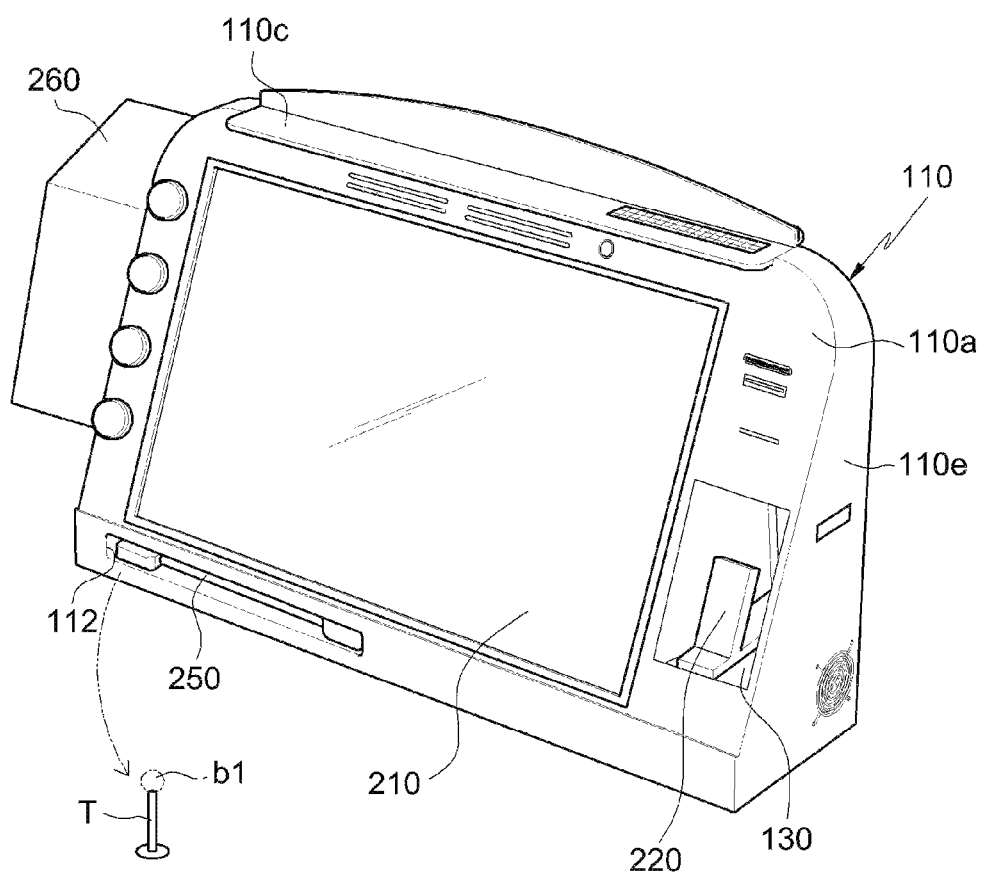
FIG. 26 is a perspective illustration of the housing type golf simulation apparatus that can feed the golf ball.
Figure 27:
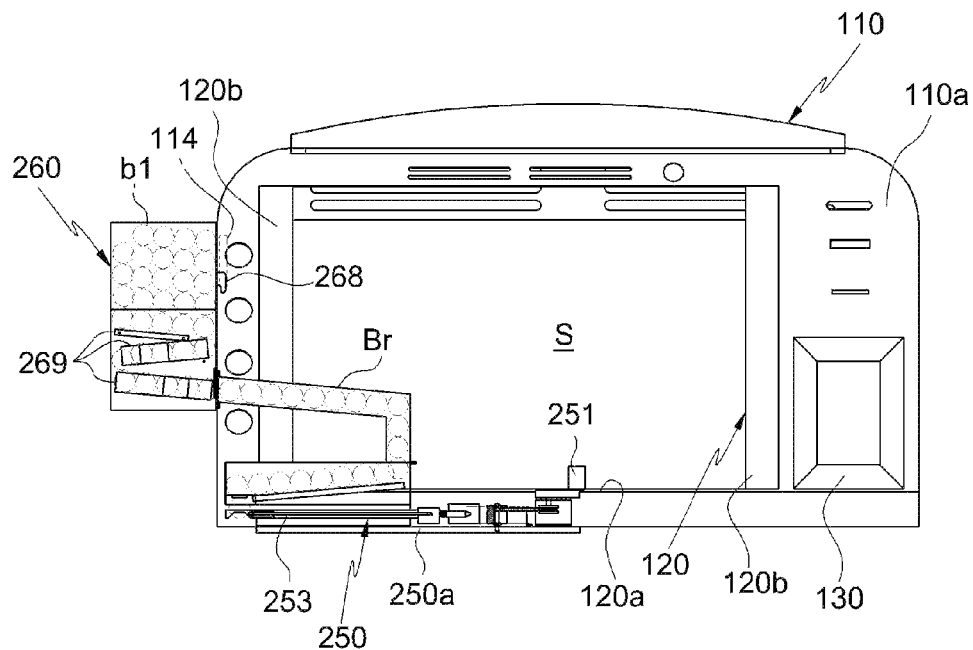
FIG. 27 is a sectional block diagram for the portion of FIG. 26.
Figure 28:
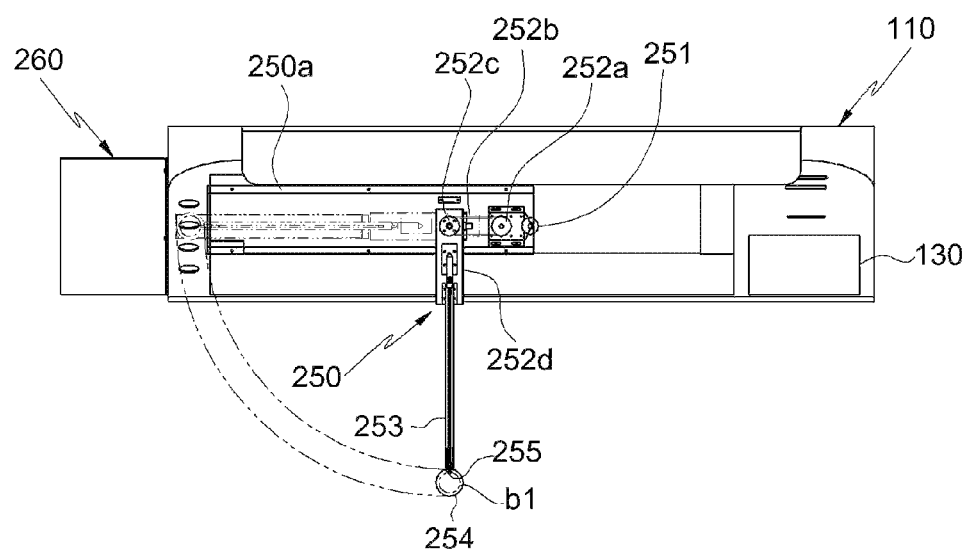
FIG. 28 is the operating view for rotation of the golf ball feeder and top view of the embodiment in FIG. 26.
Figure 29:
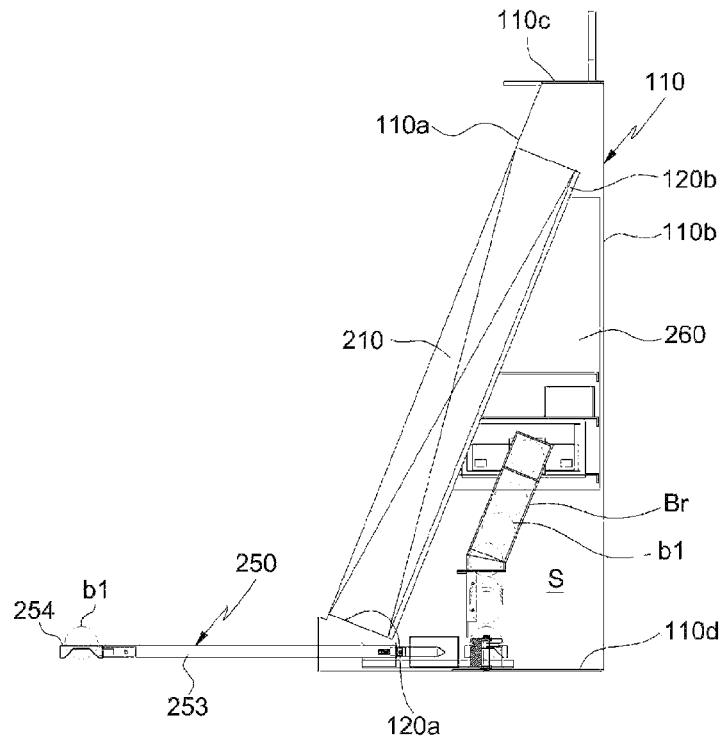
FIG. 29 is the side view of the embodiment in FIG. 26.
Figure 30:
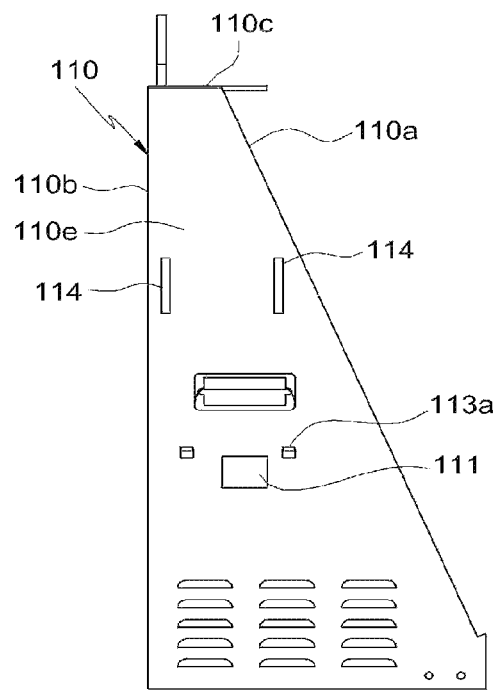
FIG. 30 is the left side view of the embodiment in FIG. 26.
Figure 31:
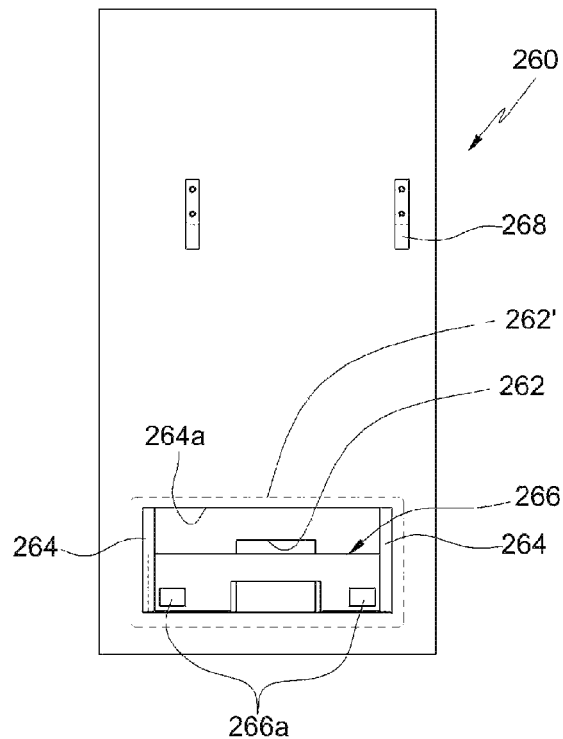
FIG. 31 is the front view of the golf ball storage box (260) in the embodiment in FIG. 26.
Figure 32:
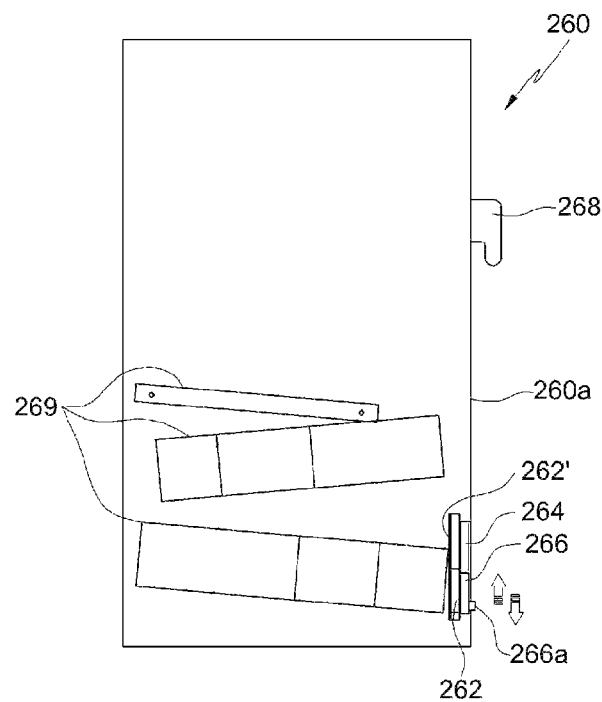
FIG. 32 is the side view of the golf ball storage box (260).
Figure 35:
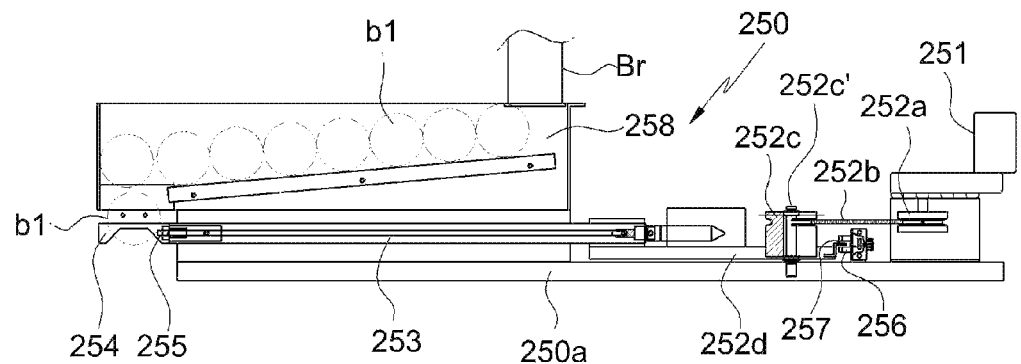
FIG. 35 is the side view of the golf ball feeder (260).

It describes the embodiment disclosed in FIG. 26 or FIG. 35.

As disclosed in FIG. 26 or FIG. 35, the housing type golf simulation apparatus (A) in one embodiment of the present invention features that there is a arm haunting unit (112) so that the arm (253) of the golf ball feeder (250) can be haunted in the bottom of the said front (110a) housing (110); it is installed in the internal space (S) of the housing (110); and that it also includes the golf ball feeder (250) to feed the golf ball (b1) to the outside of the housing (110) through the arm haunting unit (112).

The housing type golf simulation apparatus (A) in one embodiment of the present invention features that the said golf ball feeder (250) includes and adapts the receiving ring (254) to receive the feeding golf ball (b1); ball detection sensor (255) to output the detection signal by sensing that the golf ball is received in the said receiving ring (254); control board (not shown) to output the motor drive signal for driving the motor (251) based on the signal output from the said ball detection sensor (255); motor (251) driven by the motor drive signal output at the said control board (not shown); and the rotation arm (253) to feed the golf ball (b1) to the outside of the housing (110) by haunting the said arm haunting unit (112) after rotating according to the drive of the said motor (251) as the said receiving ring (254) is installed in the edge.

The housing type golf simulation apparatus (A) in one embodiment of the present invention includes and adapts additional power transfer member to transfer the rotation of the motor (251) to the rotation arm (253).

The said power transfer member adapts motor pulley (252a) rotating by the rotation of the motor (251); arm pulley (253c) connected with the wound belt (252b) in the said motor pulley (252a) and said belt (252b); and the rotation plate (252d) rotating the rotation arm (253) by the rotation as the rotation shaft (252c') of the rotating arm pulley (252c) is stood up and fixed in one end so the arm pulley (252c) rotates interconnecting with the rotation and the trailing end of the said rotation arm (253) is fixed.

In addition, the housing type golf simulation apparatus (A) in one embodiment of the present invention features that it includes and adapts additional arm rotation detection sensor (256) to detect whether it is folded getting into the internal space (S) of the housing (110) that is the rotation condition of the rotation arm (253) or it is in the rotation condition to feed the golf ball (b1) to the golf tee (T) based on whether or not the arm rotation detection piece (257) installed and fixed in the said rotation plate (252d) and the said arm rotation detection piece (257) are within the sensing scope.

That is, if the rotation arm (253) is folded and the arm rotation detection piece (257) is located within the arm rotation detection sensor (256) or if the arm rotation detection piece (257) is located at where derailing from the arm rotation detection sensor (256) by rotation in order for the rotation arm (253) to feed the golf ball to the golf tee (T), the arm rotation detection sensor (256) will output the voltage signal corresponding to each condition to the main board.

The housing type golf simulation apparatus (A) in one embodiment of the present invention features that it includes and adapts the storage box (260) keeping the golf ball (b1) feeding to the said golf ball feeder (250) as it is provided in the said housing (110) and additional conveying pipe (Br) which is a path to feed the golf ball (b1) provided by the said storage box (260) to the said golf ball feeder (250).

The housing type golf simulation apparatus (A) in one embodiment of the present invention features that a multi-storage box rail (269) is installed inside the said storage box (260) to feed the golf ball (b1) efficiently.

It is installed in the bottom (110d) of the housing (110) as the numeral (250a) is the feeder base to mount the structure of the golf ball feeder.

The housing type golf simulation apparatus (A) in one embodiment of the present invention features that the storage rack (268) is formed by projecting in the front (260a) of the said storage box (260); there is a rack hole (114) in one end of the side (110e) of the said housing (110) so that it is hung in the said storage rack (268); there is an outlet (262) hole to exit the golf ball (b1) kept in the storage box (260); a pass (111) is formed in the side (110e) of the said housing (110) below the said rack hole (114) so as to interconnect with the said outlet (262); and that the inlet of the said conveying pipe (Br) is connected with the said pass (111).

In the housing type golf simulation apparatus (A) in one embodiment of the present invention, the outlet of the said conveying pipe (Br) is connected with the golf ball feeder (250) to feed the golf ball (b1) to the receiving ring of the said golf ball feeder (250).

To make it more desirable, it features that the feeder guide rail (258) which connects the receiving ring (254) and the outlet of the conveying pipe (Br) is provided in the golf ball feeder (250) to have the golf ball (b1) conveying from the said conveying pipe (Br) arrive at the said receiving ring more accurately.

The housing type golf simulation apparatus (A) in one embodiment of the present invention features a pair of the slide guide grooves (264) to be installed separately each other in the front (260a) of the said storage box (260); the shutter (266) to open the outlet (262) of the said storage box (260) by ascending along with the said slide guide groove (264) if the external power works preventing the golf ball (b1) from getting out by closing the outlet (262) of the said storage box (260) and by descending along with the said slide guide groove (264) due to the self-load, installing so as to slide upward and downward in the said slide guide groove (264); open doljo projected in the front of the said shutter (266); and that it also includes and adapts additional stop doljo (113a) projected outward at the side (110e) of the said housing (110) from the upper side of the said pass (111) so that it will work relative motion to ascend upward against the said shutter (266) by contacting the said open doljo (266a) if the said storage box (260) is descended downward by hanging the said storage rack (268) on the said rack hole (114) to hang the said storage box (260) on the housing (110).

According to the above structure, if the storage box is installed by hanging on the housing it has effect that the golf ball in the storage box will be fed to the golf ball feeder automatically through the conveying pipe while automatically blocking the feed of golf ball provided by the conveying pipe by automatically closing the outlet of the storage box if the storage box is removed from the housing.

It describes in detail the structure to install the shutter (266) to open/close the outlet (262) by sliding upward and downward along with the slide guide groove (264) as above.

The hollow hole (264a) is formed in the lateral side (110e) of the housing (110); the said one pair of the slide guide grooves (264) is formed in the inner peripheral portion of the left and right side of the said hollow hole (264a); the outlet (262) in connection with the said hollow hole (264a) is formed; and when the outlet plate (262') to cover the said hollow hole (264a) partially is mounted inside of the lateral side (110e) of the housing that the hollow hole (264a) is formed, the shutter (266) to open/close the outlet (262) can be installed by sliding upward and downward along with the slide guide groove (264).

Now it is described about the operation to feed the golf ball.

Figure 33:
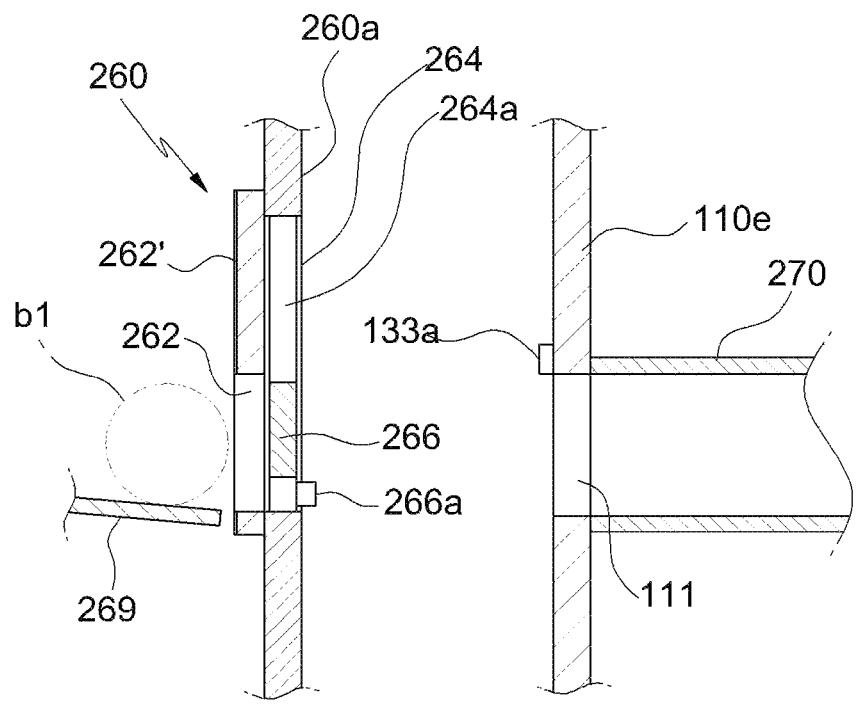
FIGS. 33 and 34 are the operating view showing that the shutter (266) of the golf ball storage box is to open and close the outlet (262).
Figure 34:
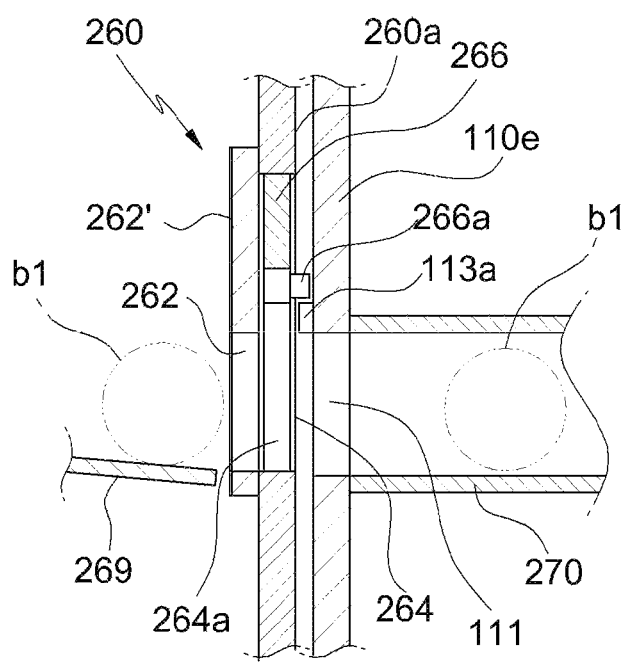

FIG. 33 illustrates the sectional view of the operation in the close condition of the outlet (262) as the shutter (266) is descended downward due to the self-load and the storage box (260) is removed from the housing (110). FIG. 34 illustrates the sectional view of the operation in the open condition of the outlet (262) as the storage box (260) is mounted in the lateral side (110e) of the housing (110) and the shutter is ascended upward.

To hang the storage rack (268) on the rack hole (114), put the storage rack (268) into the rack hole (114) and then descend the storage box (260) downward.

It is described about the processing how to feed the golf ball (b1) kept in the storage box (260) to the golf ball feeder (250) automatically.

If the storage box (260) is descended downward in such condition that the storage rack (268) was put into the rack hole (114), the open doljo (266a) projected in the front of the shutter (266) contacts the stop doljo (113a) descending the storage box (260) itself descended downward but the shutter (2666) having the open doljo (266a) is blocked without descending due to the stop doljo (113a), so the shutter will do relative motion to ascend upward relatively along with the slide guide groove (264) as the storage box (260) is descended downward.

As described above, if the shutter (266) is ascended upward relatively along with the slide guide groove (264), the outlet (262) will be open and the golf ball (b1) kept in the storage box (260) is come to the conveying pipe (Br) through the outlet (262) and the pass (111) and then it is fed to golf ball feeder (250).

Now, it is described about the operation to close the outlet (262) as the storage box (260) gets out of the housing (110) and the shutter (266) is descended automatically.

When the storage box (260) gets out of the housing (110), contacting the open doljo (266a) is lifted from the stop doljo (113a) which blocked descending the shutter (266) and at the same time the shutter (266) is descended downward along with the slide guide groove (264) automatically by the self-load to close the outlet (262) and then the golf ball (b1) in the storage box will not get out of the storage box (260).

Figure 36:
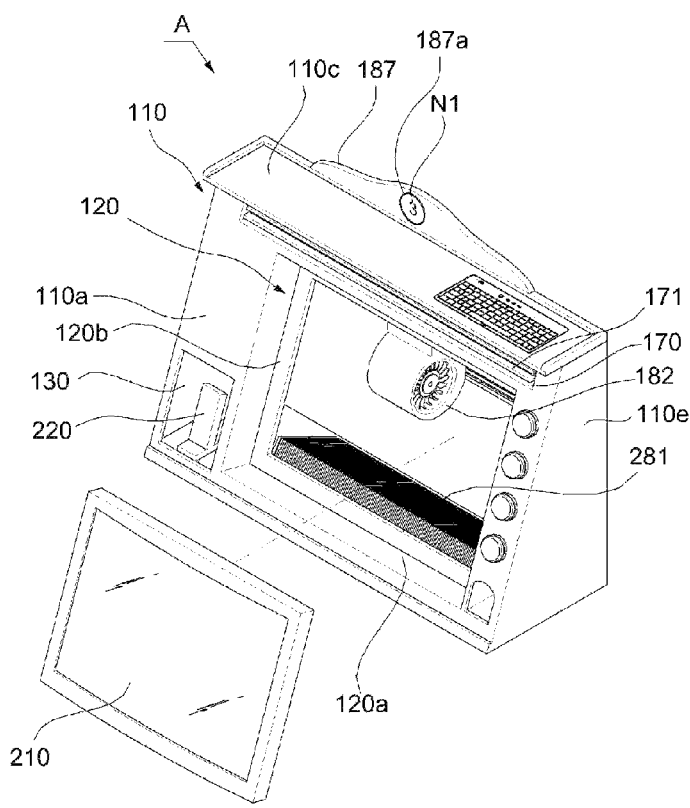
FIG. 36 is a perspective illustration for decomposition to illustrate inside the housing type golf simulation apparatus that the heating and cooling is available.
Figure 38:
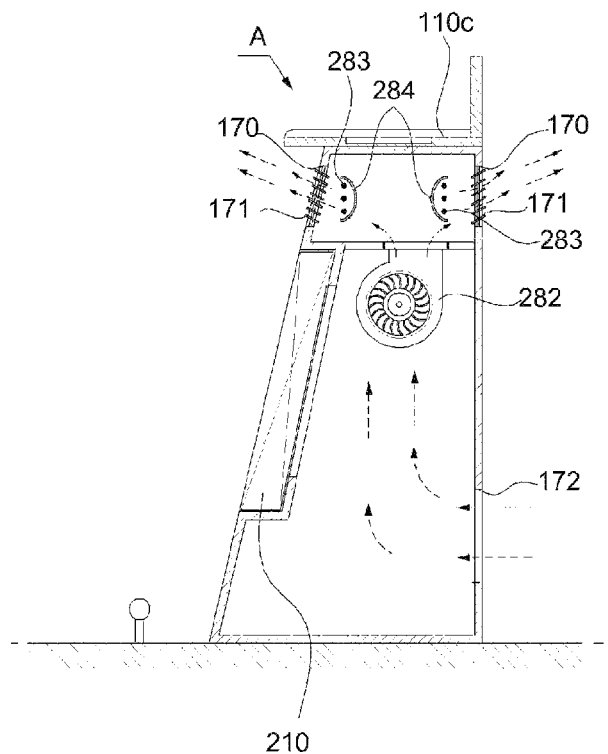
FIG. 38 is the sectional view and operation view of the modified embodiment in FIG. 36.

It describes the housing type golf simulation apparatus (A) that cooling and heating is available based on FIG. 36 or FIG. 38.

Figure 37:
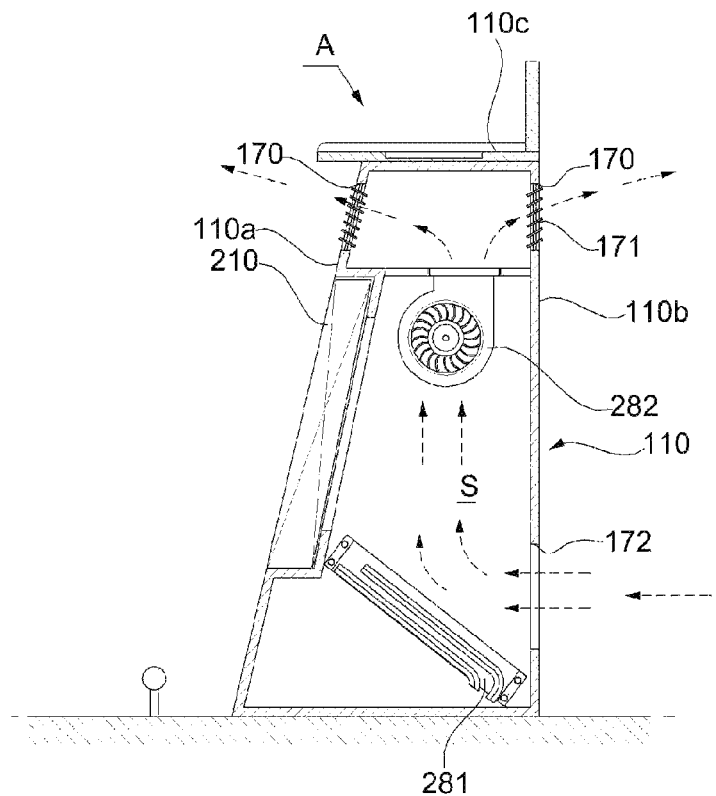
FIG. 37 is the sectional view and operation view of the embodiment in FIG. 36.

The arrow mark illustrated in FIG. 37 shows the cooling or heating air flow and the arrow mark illustrated in FIG. 38 shows the heating air flow.

As illustrated in FIG. 36 or FIG. 38, the housing type golf simulation apparatus (A) in one embodiment of the present invention features that it includes and adapts the discharger (170) which is formed in one end of the said housing (110) so that the cooling or heating air will be discharged, inlet (172) which is formed in the other side of the said housing (110) so that the air of the golf practice court will flow in, and the heat exchanger (281) to generate cooling or heating air by exchanging heat with the air come from the said inlet (172) and the said internal space (S) is provided.

According to the above structure, the cooling or the heating air is discharged inside the swing box housing (110) and since such cooling or heating air discharged is directly transferred to the player who is at the near distance the efficiency of heating and cooling will be improved. Especially if the simulation apparatus (A) by the present invention is installed at the golf practice court, it can be used as a swing box partition, so it has the advantage to save much more energies than when the HVAC facility has to be operated.

The said heat exchanger (281) will be run as an evaporator if it functions as a cooling means and it will be run as a condenser if it functions as a heating means.

And in one embodiment of the present invention, the feature is that the air is absorbed to the said inlet (172) by force and that it includes and adapts the blower (282) provided in the said internal space (S) from the upper direction of the said heat exchanger (281) to discharge the cooling or heating air generated from the said heat exchanger (281) to the said discharger (170) by force.

It features that the air guide (171) is installed in the said discharger (170) to control the direction of the cooling or heating air to be discharged.

The housing type golf simulation apparatus (A) in one embodiment of the present invention features that it provides compressor (not shown), the $2^{nd}$ heat exchanger (not shown) and expansion valve (not shown) to adapt the heat exchange cycle by connecting with the said heat exchanger (281) and refrigerant pipe (not shown) so that the said heat exchanger will generate the cooling or heating air.

Compressor, the $2^{nd}$ heat exchanger and expansion valve which adapt the heat exchange cycle along with the said heat exchanger (281) feature that they are provided in one of external spaces of the housing (110) or internal space (S) of the housing (110) depending on the installation and use conditions.

The said compressor is connected with the heat exchanger (281) and refrigerant pipe and compresses and circulates the refrigerant at high temp and high pressure; the said $2^{nd}$ heat exchanger is connected with the said compressor and refrigerant pipe; if the said heat exchanger (281) is run as a condenser it is operated as an evaporator; and the said expansion valve is installed between the said heat exchanger (281) and the $2^{nd}$ heat exchanger, so the refrigerant come after condensing from either said exchanger or the $2^{nd}$ heat exchanger will be expanded for insulation at low pressure to provide to another heat exchanger.

And if the heat exchange cycle which is adapted including compressor, the $2^{nd}$ heat exchanger, expansion valve and heat exchanger (281) needs to be operated for both cooling cycle and heating cycle, it is connected with the said compressor and such refrigerant compressed at the said compressor will be circulated to the said heat exchanger (281) depending on the type of cooling cycle or heating cycle or it adapts to include additional or 4-way valve to be circulated by the said $2^{nd}$ heat exchanger.

Thus, the heat exchanger by the present invention functions as a cooling device to generate the cooling air or heating device to generate heating air and at this moment the heat exchanger implemented as a heating device and the heat exchanger implemented as a cooling device may be implemented separately and independently or 4-way valve can be provided additionally at one heat exchange cycle device to convert the refrigerant circulating direction optionally and by driving the cooling cycle and heating cycle optionally, so that it can function as a cooling/heating device to generate cooling or heating air optionally as a heat exchanger.

In the said heat exchange cycle, the $2^{nd}$ heat exchanger fan (not shown) is provided in the $2^{nd}$ heat exchanger to enhance the heat exchange efficiency or different adaptations may be provided additionally to enhance the efficiency of heating and cooling if necessary, and since such technical adaptation has been already known before applying the present invention, the detailed description is deleted.

As illustrated in FIG. 38, the housing type golf simulation apparatus in other embodiments of the present invention features that the heating means (283) sending to the discharger (170) by heating the surrounding air is provided in internal space (S).

The said heating means (283) may adapt heat wire which generates heat by the electric resistance or induction heater using induction heating method, and of course all such methods of heating by providing the heat to the surrounding air belong to the technical scope of the present invention.

And other embodiments of the present invention feature that the air is absorbed to the said inlet (172) by force and that it includes and adapts the blower (282) which is provided in the said internal space (S) at the rear edge of the said heating means (283) so that the air heated by the said heating means (283) can be discharged to the said discharger (170) by force.

The rear side of the said heating means (283) has a feature that a reflector (284) which reflects the heat is provided so that the heat as the heating means (283) is well discharged to the discharger (170).

In one embodiment of the present invention, it features a heating mode switch which is to operate the heating mode to generate warm air by operating the said heat exchanger (281) by the condenser; cooling mode switch which is to operate the cooling mode to generate the cooling air by operating the said heat exchanger (281) by the evaporator; and that it includes and adapts additional control panel (not shown) in which heating means run switch, etc. are provided. The said control panel may be installed in one of certain places in the housing (110) and also it may be installed by separating from the housing (110).

Figure 39:
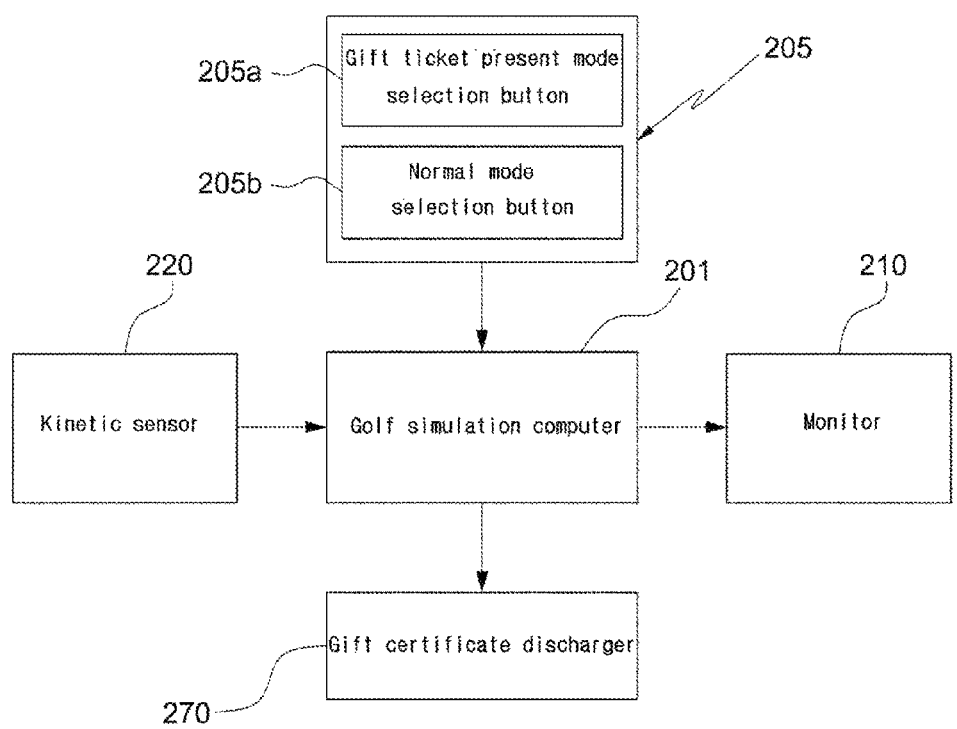
FIG. 39 is a block diagram of the housing type golf simulation apparatus that is available with the discharge function for gift ticket.
Figure 40:
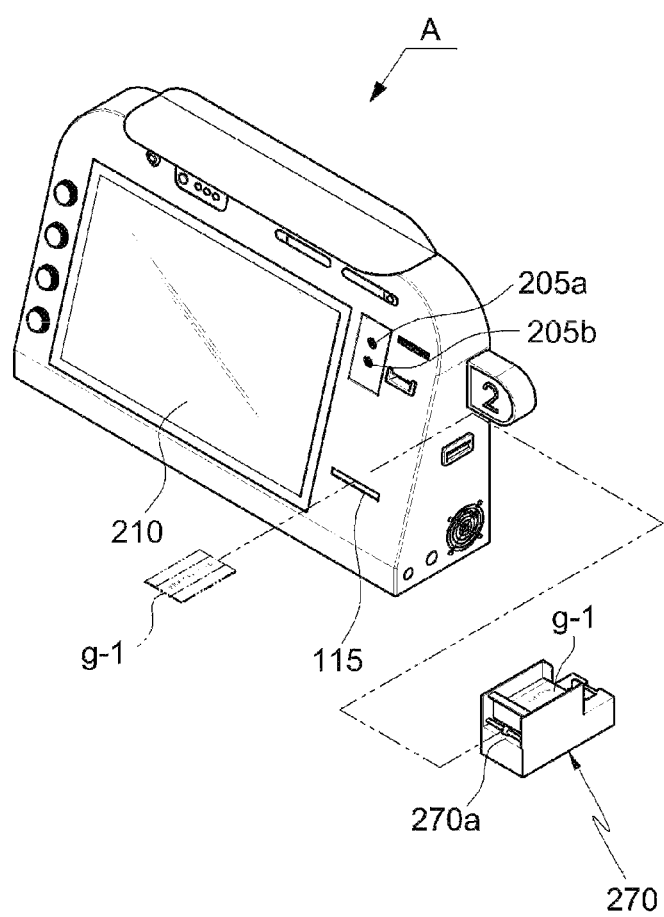
FIG. 40 is the portion decomposition Figure of the housing type golf simulation apparatus that is available with the discharge function for gift ticket.
Figure 41:
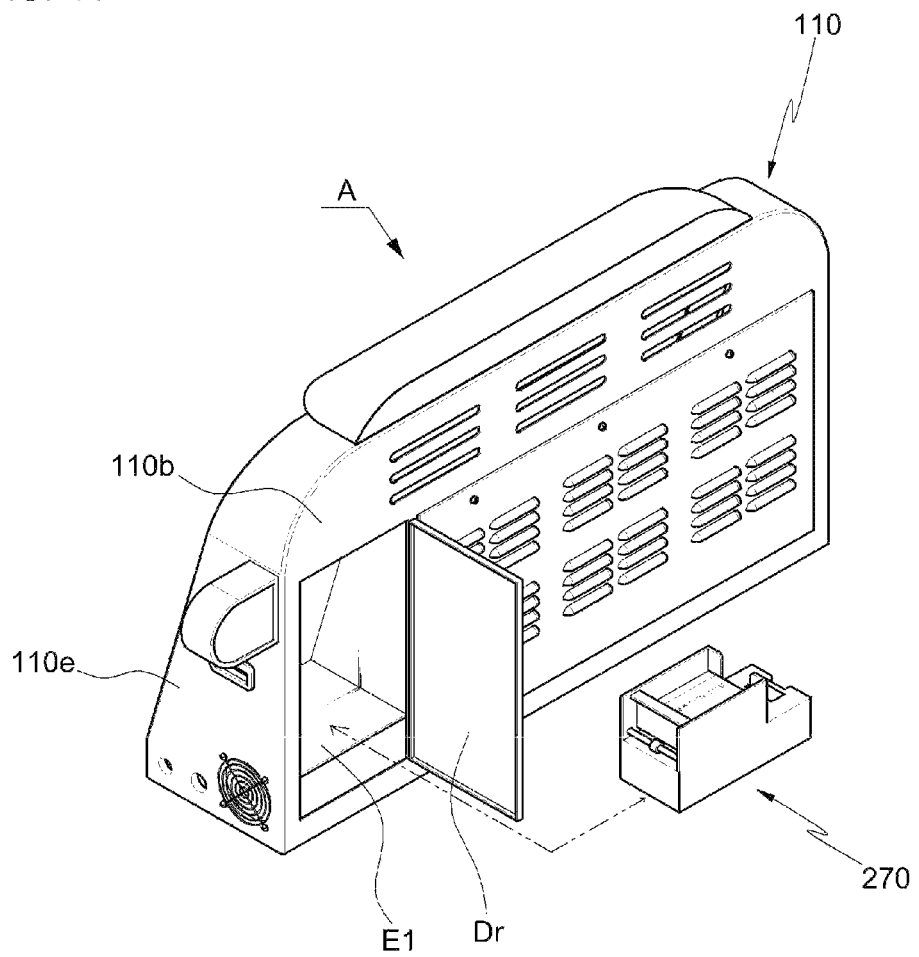
FIG. 41 is a rear perspective illustration and portion separation view of FIG. 40.

It is described about the housing type golf simulation apparatus (A) which has a function to discharge the gift ticket based on FIG. 39 or FIG. 41.

As illustrated in FIG. 39 and FIG. 41, the housing type golf simulation apparatus in one embodiment of the present invention features that the said golf simulation computer (201) extracts "function for the current play condition" based on the kinetic data of the golf ball input from the kinetic sensor (220) and if the function for the current play condition extracted is corresponded to "function for the play condition to present gift ticket" which is the function for the play condition that becomes the target for presenting the gift ticket already saved inside then the gift ticket discharge signal is output and that it includes and adapts additional discharger (270) for the gift ticket discharging the gift ticket (g-1) in case of receiving the discharge signal for the gift ticket from the said golf simulation computer (201) as it is provided in the internal space (S) of the housing (110).

The said gift ticket discharger (270) is to load the gift tickets (g-1) and adapts that the gift ticket loaded (g-1) will be discharged through the outlet (270a) by the internal motor, drive roller, belt, etc. and since it was already known to ordinary technicians before applying the present invention, the detailed description is skipped.

The housing type golf simulation apparatus in one embodiment of the present invention features that there is a discharger (115) for gift ticket in the front (110a) of the said housing (110) so that the gift ticket (g-1) discharging from the said gift ticket discharger (270) is discharged to the outside of the housing (110).

The housing type golf simulation apparatus in one embodiment of the present invention features that a place (E1) to place the said gift ticket discharger (270) is installed in the internal space (S) of the said housing (110) and a door to open and close the internal space (S) that the said place was installed is provided in the rear side (110b) of the said housing (110).

The housing type golf simulation apparatus in one embodiment of the present invention features that in the said golf simulation computer (201) the state function data saving part (not shown) is provided as "play state function to present gift ticket" which is the play state function becoming the target for presenting the gift ticket is memorized and that if the current play state function is corresponded to the play state function to present the gift ticket saved in the said state function data saving part (not shown), the gift ticket discharge signal is output to the said gift ticket discharger (270).

The housing type golf simulation apparatus in one embodiment of the present invention features that it includes and adapts additional service mode option part (205) to input the command selecting the normal mode and gift ticket present mode.

As illustrated in FIG. 39, there are optional button (205a) for the gift ticket present mode which is the user interface to input the commend to run "gift ticket present mode" as a service mode to present by discharging the gift ticket if it is corresponded to the play that a player's game is set in the service mode option (205) and optional button (205b) for normal mode to input the command to run "normal mode" which is the normal simulation game mode without presenting the gift ticket even when it is corresponded to a certain play.

And the said golf simulation computer (201) features that it determines whether or not the command to run the gift ticket present mode is input from the said service mode option (205) while loading the gift ticket present play state function which is corresponded to the gift ticket present mode selected based on the command to run the gift ticket present mode received to the inside memory (not shown) from the said state function data saving part (not shown) and if the current play state function is corresponded to the gift ticket present play state function saved in the said state function data saving part (not shown), the gift ticket discharge signal is output to the said gift ticket discharger (270).

The housing type golf simulation apparatus in one embodiment of the present invention features that the said gift ticket present play belongs to one of continuous buddy, eagle, hole-in-one, albatross and lowest score.

It is described about the operation to discharge and present the gift ticket.

First, a player determines whether or not the commend to run the gift ticket present mode is input by pressing the option button (205a) for the gift ticket present mode in the service mode option (205) and if the commend to run the gift ticket present mode is received from the said service mode option (205), the gift ticket present play state function which is corresponded to the gift ticket present mode selected based on the command of the gift ticket present mode received will be loaded in the internal memory (not shown) from the said state function data saving part (not shown).

Now, when the player hits the golf ball (b1) on the golf tee (T) using a club and the golf simulation game is run, check the current pray condition to extract the current play state function and if the current play state function extracted is matched to the gift ticket present play state function loaded in the memory, the gift ticket discharge signal is output to the gift ticket discharger (270).

The gift ticket discharger (270) which received the gift ticket discharge signal from the golf simulation computer (201) discharges the gift ticket through the outlet (270a) and such gift ticket (g-1) discharged will finally be discharged to outside of the housing (110) through the gift ticket discharger (115).

Figure 42:
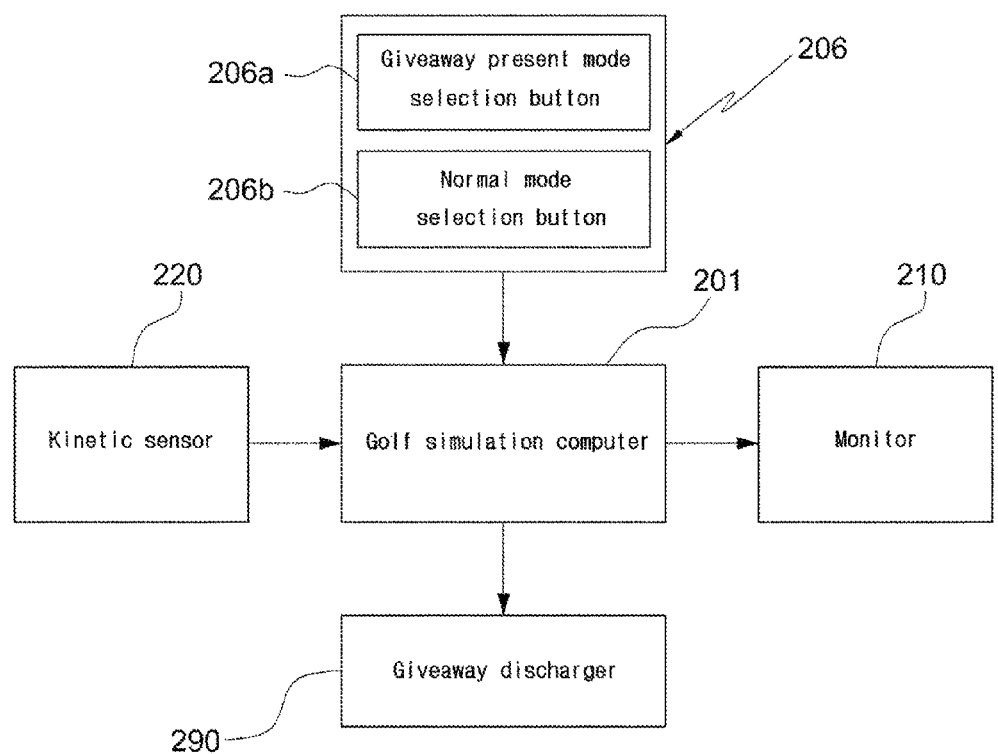
FIG. 42 is a block diagram of the housing type golf simulation apparatus that is available with the discharge function for giveaway.
Figure 43:
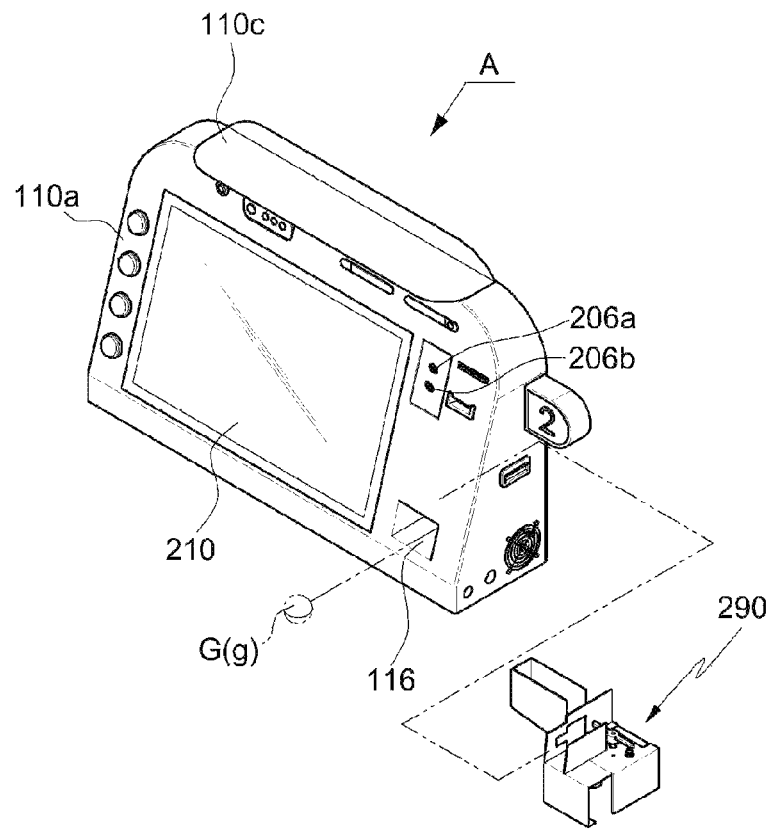
FIG. 43 is the portion decomposition Figure of the housing type golf simulation apparatus that is available with the discharge function for giveaway.
Figure 44:
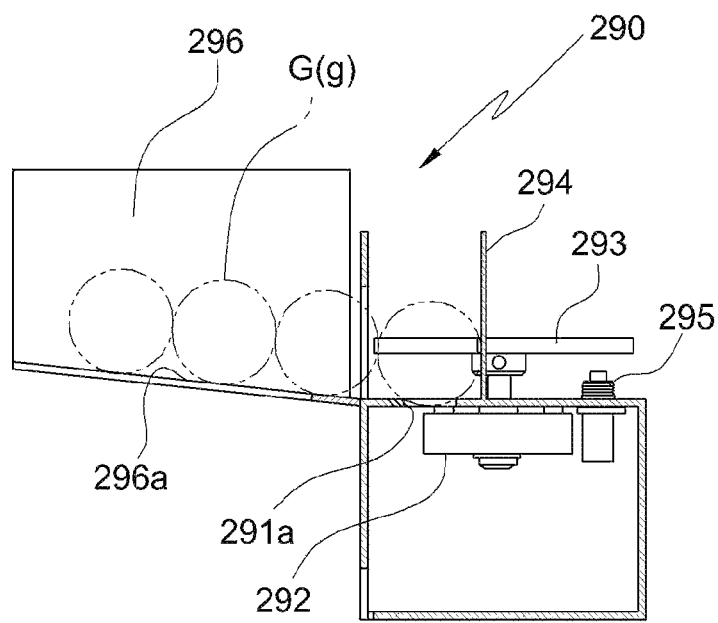
FIG. 44 is the front view of the giveaway discharger (290) in FIG. 43.
Figure 45:
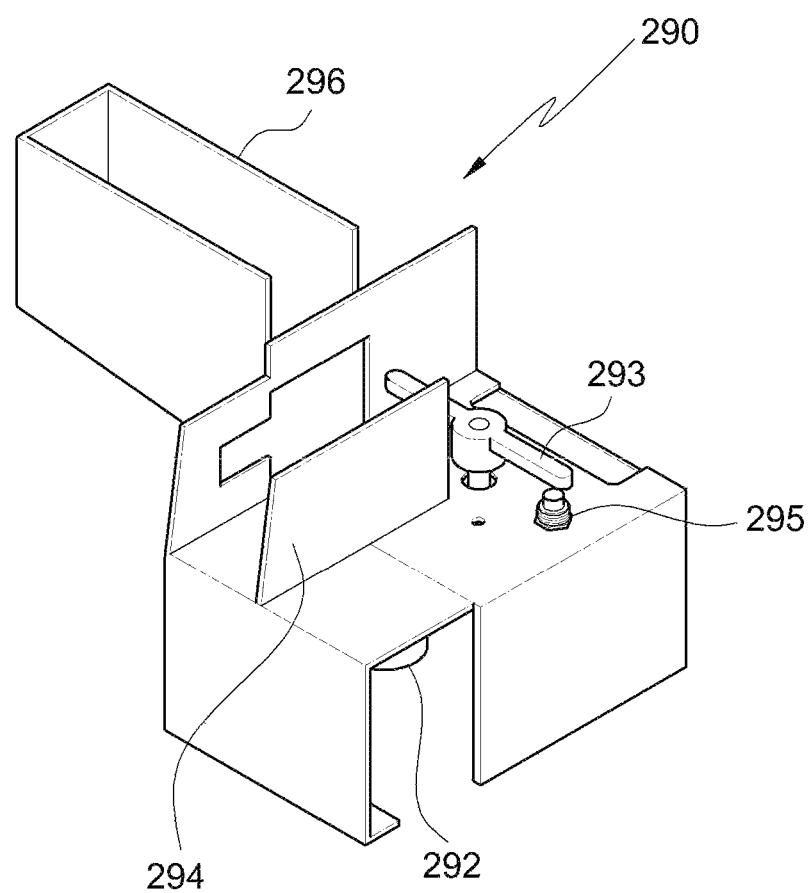
FIG. 45 is a perspective illustration of the giveaway discharger (290).
Figure 46:
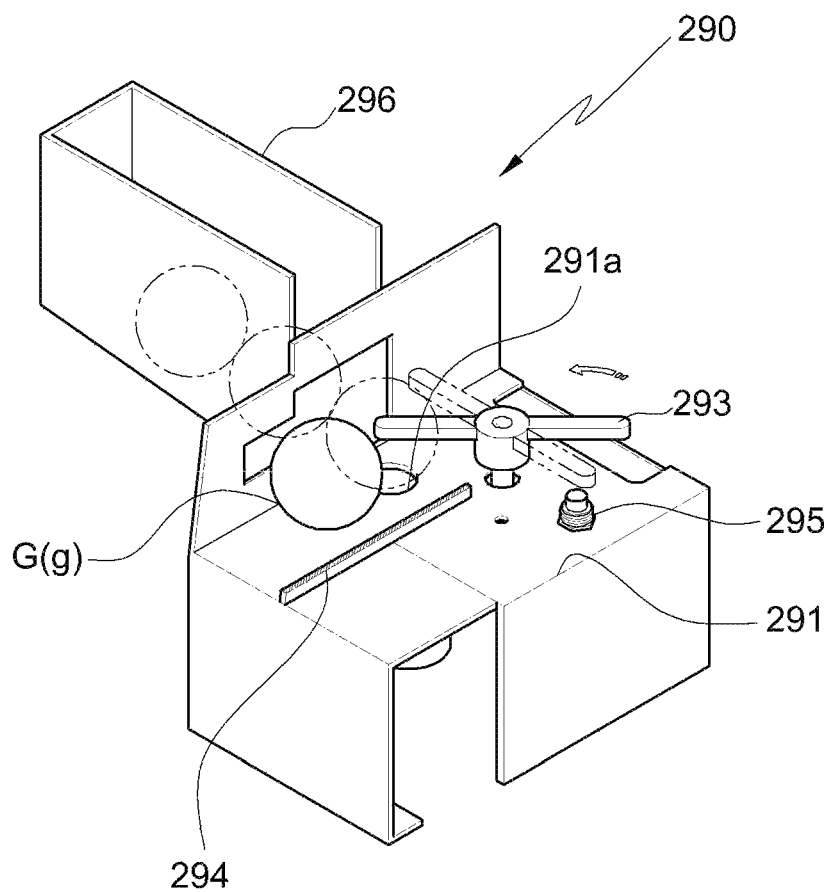
FIG. 46 is a perspective illustration showing partial incision and operation view of the discharge guide in FIG. 45.
Figure 47:
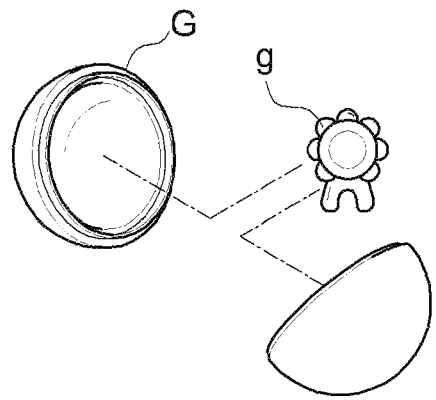
FIG. 47 is a perspective illustration separating the giveaway (g) and the giveaway storage group (G) in case of separating the giveaway storage group (G).

The following describes the embodiment by the housing type golf simulation apparatus (A) which has the discharge function for the giveaway disclosed in FIG. 42 and/or FIG. 47.

As illustrated in FIG. 42 or FIG. 47, in the housing type golf simulation apparatus (A) with the giveaway discharge function in one embodiment of the present invention, the said golf simulation computer (201) extracts "current play state function" based on the kinetic data of the golf ball input from the kinetic sensor (220) and if the current play state function extracted is corresponded to "the giveaway present play state function" which is the play state function that becomes the target to present the giveaway already saved inside, it will output the giveaway discharge signal.

The feature is that it includes and adapts additional discharger (290) of the giveaway to discharge the giveaway (g) if it is provided in the internal space (S) of the housing (110) and the giveaway discharge signal is received from the said golf simulation computer (201).

The housing type golf simulation apparatus (A) in one embodiment of the present invention features that there is a discharger (116) for the giveaway in the front (110a) of the said housing (110) so that the giveaway (g) to be discharged from the said discharger (290) for the giveaway will be discharged to the outside of the housing (110).

FIG. 47 illustrates a separate perspective Figure for the giveaway (g) and giveaway keeping group (G) if the giveaway keeping group (G) is separate.

The housing type golf simulation apparatus (A) in one embodiment of the present invention features that the said discharger (290) for the giveaway discharges the giveaway (g) through the said discharger (116) for the giveaway by putting the giveaway (g) into the giveaway keeping group (GG) in spherical shape.

That is, the giveaway (g) is provided by putting it into the giveaway keeping group (G) and such giveaway keeping group (G) can be separate in a pair of hemisphere as illustrated in FIG. 47, and if the hemisphere is combined after putting the giveaway (g) into the separated hemisphere, the giveaway (g) can be stored (kept).

The said giveaway discharger (290) features that it includes and adapts the seated unit (291) with the seated hole (291a); motor (292) to be installed in the seated unit (291); the giveaway discharge rotation arm (293) to be installed to be able to rotate in the said seated unit (291) so that it can be discharged by hitting the giveaway keeping group (G) seated in the said seated hole (291*a*) with the rotation by the said motor (292) drive; and the discharge guide (294) to be installed in the said seated unit (291) to guide the giveaway keeping group (G) hit by the said giveaway discharge rotation arm (293) to the giveaway discharge group (116).

And the housing type golf simulation apparatus (A) in one embodiment of the present invention features that the said giveaway discharger (290) includes and adapts additional storage box (296) for the giveaway to provide the giveaway keeping group (G) to the seated hole (291*a*) while keeping the giveaway keeping group (G).

The bottom (296*a*) of the said giveaway storage box (296) forms downward slope to the seated hole (291*a*), it has the advantage to provide the giveaway keeping group (G) by non-power due to the gravity.

The housing type golf simulation apparatus (A) in one embodiment of the present invention features that it includes and adapts additional rotary arm position sensor (295) to detect the position arriving at 180 degree of the rotation angle after the said giveaway discharge rotation arm (293) hits the golf ball positioned in the seated hole (291*a*) and that when the said golf simulation computer (201) received the detection signal from the said rotary arm position sensor (295), the drive stop signal which stops the said motor (292) drive is output to the said motor (292).

And the said giveaway discharger (290) is installed in the place unit (E1) provided in the internal space of the housing (110) as illustrated in FIG. 41.

The housing type golf simulation apparatus (A) in one embodiment of the present invention features that the said golf simulation computer (201) is equipped with the state function data saving part (not shown) as "the giveaway present play state function" which is the play state function becoming the target to present the giveaway is memorized and that if the current play state function is corresponded to the giveaway present play state function saved in the said state function data saving part (not shown), the giveaway discharge signal is output to the said giveaway discharger (290) [specifically motor (292)].

The housing type golf simulation apparatus (A) in one embodiment of the present invention features that it includes and adapts additional service mode option (206) to input the command selecting the giveaway present mode and normal mode.

The said service mode option (206) provides the giveaway present mode selection button (206*a*) that is the user's interface to input the command to run "giveaway present mode" that is the service mode to present by discharging the giveaway if the player's game is corresponded to the play already set and the normal mode selection button (206*b*) to input the command to run "normal mode" that is the normal simulation game mode without presenting the giveaway even when it falls under a certain play.

And the said golf simulation computer (201) features that it determines whether or not the command to run the giveaway present mode is input from the said service mode option (206); the giveaway present play state function which is corresponded to the selected giveaway present mode is loaded in the internal memory (not shown) from the said state function data saving part (not shown) based on the command to run the giveaway present mode received; and if the current play state function is corresponded to the giveaway present play state function saved in the said current state function data saving part (not shown) the giveaway discharge signal is output to the said giveaway discharger (290).

The housing type golf simulation apparatus (A) in one embodiment of the present invention features that the said giveaway present play belongs to one of continuous buddy, eagle, hole-in-one, albatross and lowest score.

The following is described about the operation to present by discharging the giveaway.

First, the player determines whether or not the command to run the giveaway present mode is input by pressing the selection button (206*a*) for the giveaway present mode in the service mode option (206) and if the commend to run the giveaway present mode is received from the said service mode option (206) then the giveaway present play state function which is corresponded to the giveaway present mode selected will be loaded in the internal memory (not shown) from the said state function data saving part (not shown) based on the command of the giveaway present mode received.

Now when the golf simulation game is run after the player hits the golf ball (b1) on the golf tee (T) using a club, check the current play state and extract the current play state function. If the current play state function extracted is corresponded to the giveaway present play state function the giveaway discharge signal is output to the motor (292) of the giveaway discharger (290).

The motor (292) received the giveaway discharge signal from the golf simulation computer (201) will be driven by rotation and the giveaway discharge rotation arm (293) is rotated by the rotation of the motor (292) to hit the giveaway keeping group (G) in the seated hole (291*a*) and then the giveaway keeping group (G) hit is guided by the discharge guide (294) to be discharged to the outside of the housing (110) through the giveaway discharger (116).

Meanwhile, if the rotation angle is at 180 degree after the giveaway discharge rotation arm (293) hits the giveaway keeping group (G), the rotary arm position sensor (295) detects it so when the detection signal is output to the golf simulation computer (201) the drive stop signal is sent to the motor (292) to stop the drive of motor (292) and the motor (292) received it will stop driving.

If the giveaway keeping group (G) in the seated hole (291*a*) is discharged by hitting, then the giveaway keeping group (G) in the giveaway storage box (296) will come down along with the bottom (296*a*) due to the gravity and then it is seated in the seated hole (291*a*).

Figure 48:
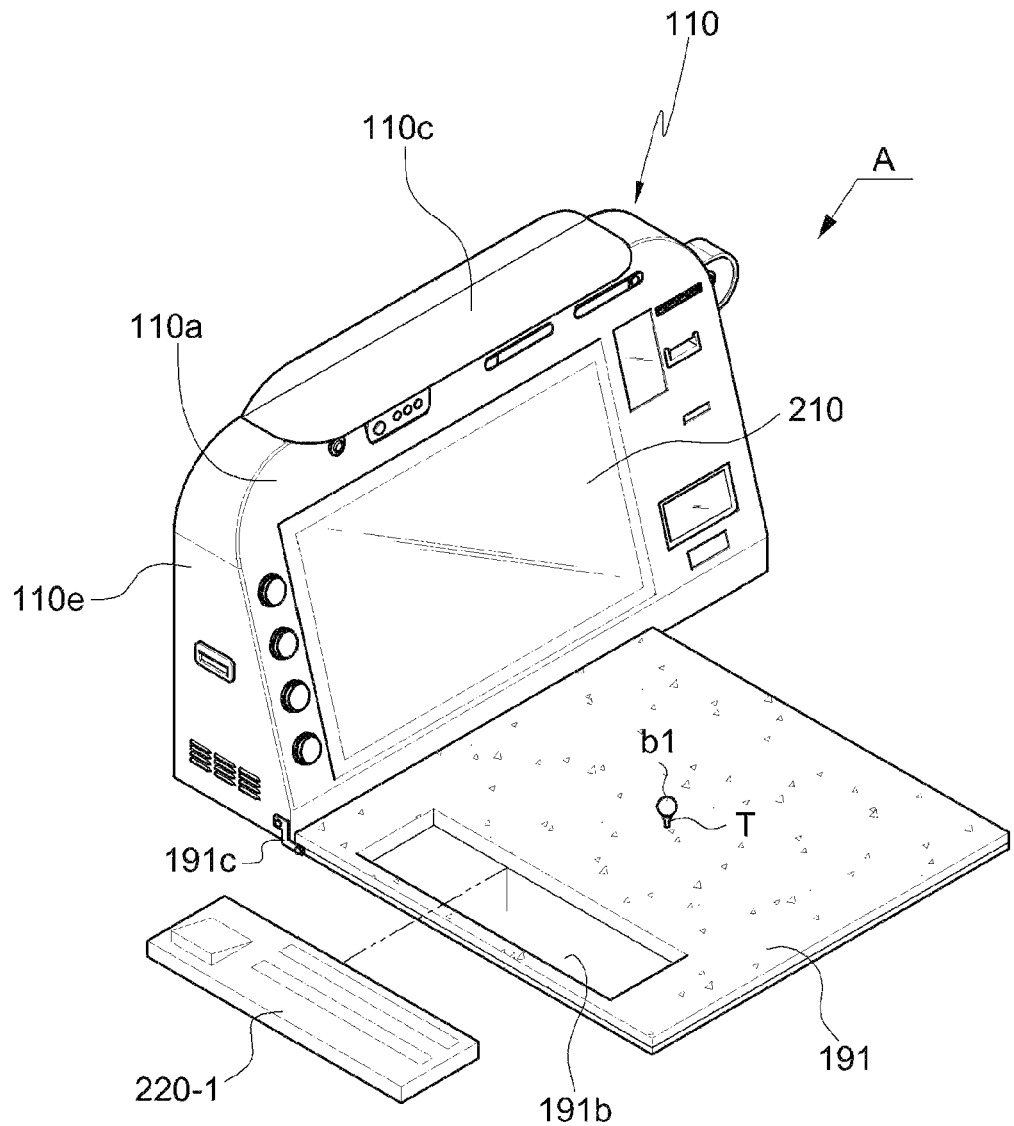
FIG. 48 is a perspective illustration of the housing type golf simulation apparatus with which the folding type tee mat is provided.
Figure 49:
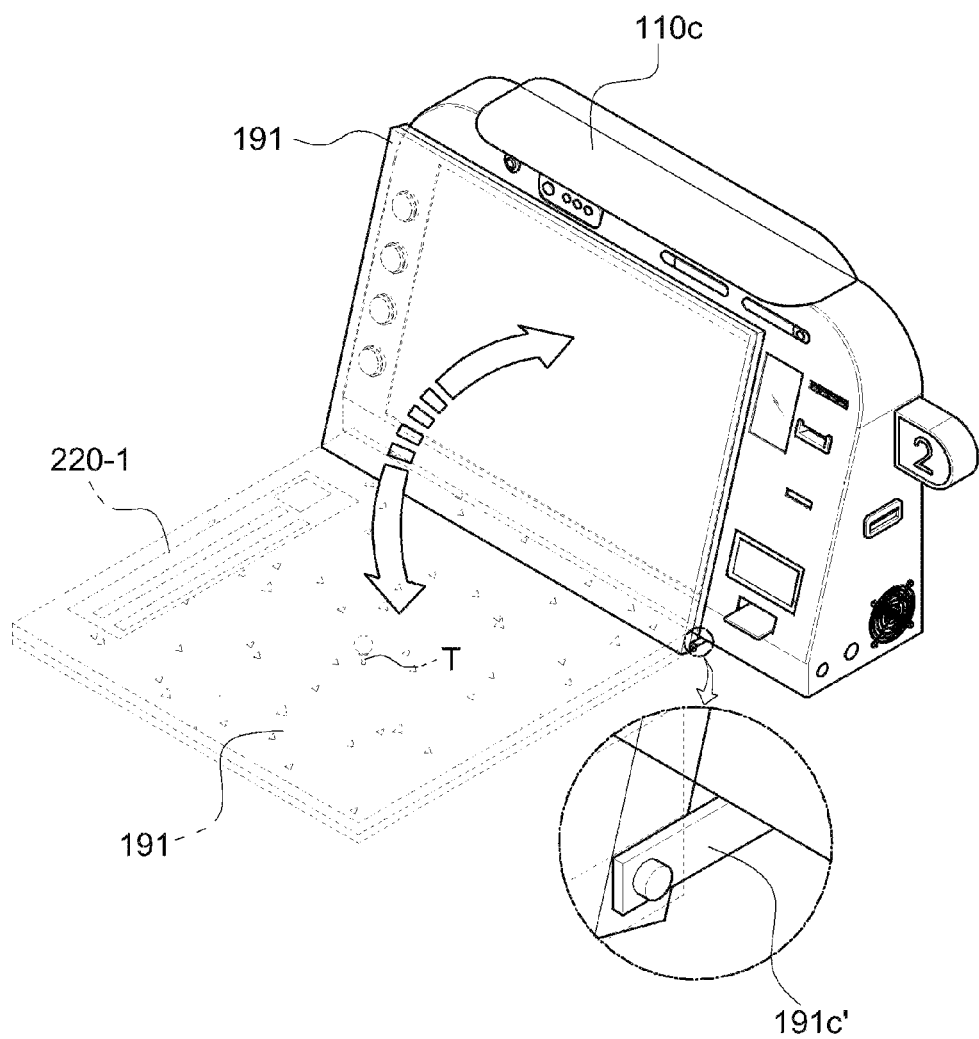
FIG. 49 is the operation view to fold and unfold the tee mat in FIG. 48.
Figure 50:
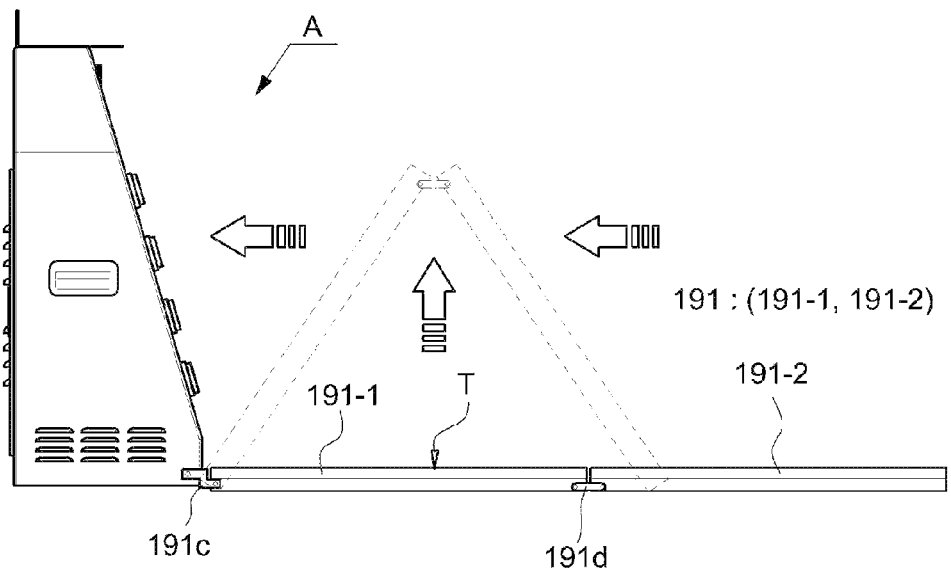
FIG. 50 is the side view and operation view in case that the tee mat is comprised of a multi segmental mat.

The following is described about the embodiment by the housing type golf simulation apparatus (A) which provides the folding type tee mat as disclosed in FIG. 48 or FIG. 50.

As illustrated in FIG. 48 or FIG. 50, the housing type golf simulation apparatus (A) in one embodiment of the present invention features that the monitor (210) can be covered and protected if the golf tee (T) is installed and it is folded by the installation to be able to rotate in the lower part of the front (110*a*) of the housing (110) and additional tee mat (191) using for the player's swing box is included and adapted if it is unfolded.

The housing type golf simulation apparatus (A) in one embodiment of the present invention features that the said tee mat (191) adapts the multi-segmental mat (191-1, 191-2) that can be folded in multi-layer and the said segmental mat (191-1, 191-2) is folded each other as it is connected by the link (191*d*).

The housing type golf simulation apparatus (A) in one embodiment of the present invention features that there is a sensor installation groove (191*b*) in the said tee mat (191)

and a sensor module (220-1) provided with the kinetic sensor is inserted in the said sensor installation groove (191b).

The housing type golf simulation apparatus (A) in one embodiment of the present invention features that it includes and adapts additional multi-hinge (191c, 191c') to be installed so that the one end is fixed in the said housing (110) and the other one is to be able to rotate in the said tee mat (191) and that the said tee mat (191) is folded or unfolded by the said hinge (191c, 191c').

Figure 51:
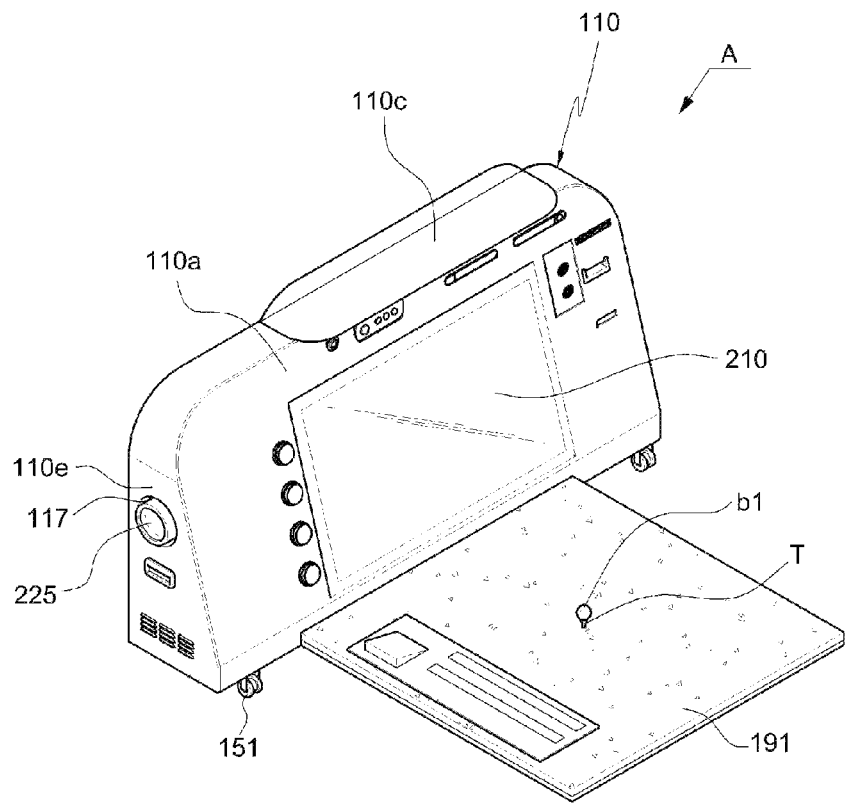
FIG. 51 is a perspective illustration of the housing type golf simulation apparatus with which the beam projector is provided.
Figure 52:
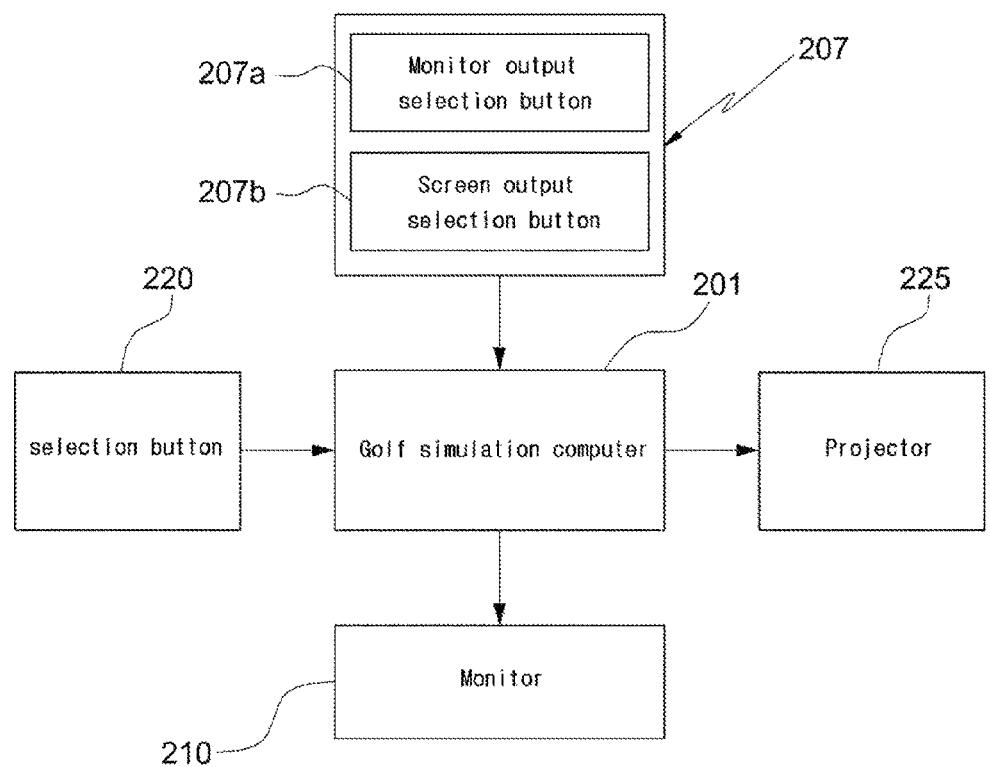
FIG. 52 is a block diagram of the housing type golf simulation apparatus with which the beam projector is provided.
Figure 54:
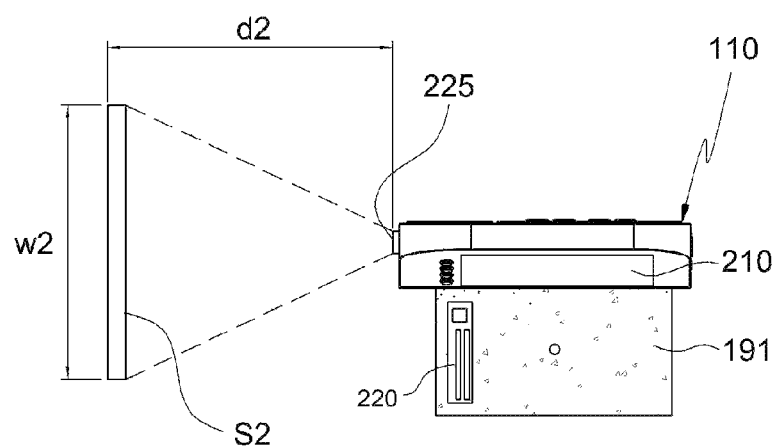

Finally, it is described about the embodiment of the housing type golf simulation apparatus (A) with the beam projector as disclosed in FIG. 51 or FIG. 54.

As disclosed in FIG. 51 or FIG. 54, the housing type golf simulation apparatus (A) with the beam projector features that it is provided in the said housing (110) and that it includes and adapts additional projector (225) to scan the image data transmitted from the golf simulation computer (201) to the screen (S1, S2) and the said golf simulation computer (201) outputs the kinetic flying image data of the golf ball (b1) with the said projector (225).

According to the above adaptation, since the position of the projector (225) can be moved by moving the housing (110), it is possible to adjust the distance between the screen (S1, S2) and the projector (225), so it has the advantage to scan the optimal image to the screen (S1, S2) depending on the distance by moving back or approaching the projector (225) to/from the screen (S1, S2) depending on the size [especially width (w1, w2)] of the screen (S1, S2).

The housing type golf simulation apparatus (A) in one embodiment of the present invention features that there is an exposing group (117) in the lateral side (110e) of the said housing (110) and the said projector (225) is installed in the internal space (S) of the housing (110) so that the front side can be exposed to the said exposing group (117).

According to the said adaptation, since the projector is installed inside the housing, it has the advantage that the projector (225) can be protected and at the same time the projector (225) can be installed stably.

The housing type golf simulation apparatus (A) in one embodiment of the present invention features that it includes and adapts additional output mode option (207) to select whether the image data of the said golf simulation computer (201) will be output to the said monitor (210) or projector (225) and that the said golf simulation computer (201) outputs the image data to either the said monitor (210) or the projector (225) depending on the output mode selection signal input from the said output mode option (207).

According to the above adaptation, the golf simulation image can be selected and output to either the screen (S1, S2) or the monitor (210) and especially it has the advantage that it provides the user with the better golf simulation play conditions as the user can select whether it should be output to the monitor (210) or the screen ( , S2).

The said output mode option (207) provides monitor output selection button (207a) to input the command and to output the image data to the monitor (210) and the screen output selection button (207b) to input the commend and to output image data to the screen (S1, S2).

Now, it is described about the operation to move the housing (110) according to the screen size.

Figure 53:
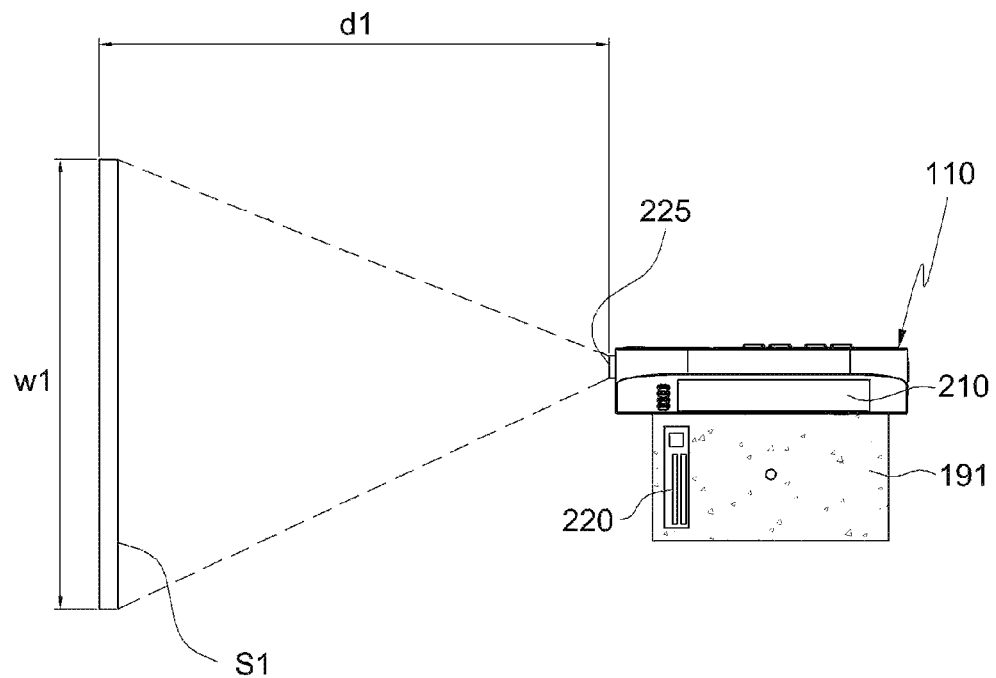
FIGS. 53 and 54 are the operation view of the embodiment in FIG. 51.

If the size is big because of large width (w1) of the screen (S1), the housing will have to be moved back, so the distance (d1) between projector (225) and screen (S1) will become farther and then it can scan the optimal image to fit the screen (S1, S2) size. (Refer to FIG. 53.)

On the contrary, if the size is small because of small width (w1) of the screen (S1), the housing will have to be pushed forward, so the distance (d2) between projector (225) and screen (S1) will become narrow and then it can scan the optimal image to fit the screen (S1, S2) size. (Refer to FIG. 54.)

As described above, we have examined the desirable embodiments by the present invention and it is evident for those who have common knowledge in the related technology that the present invention can be materialized in other certain forms without derailing from the purpose or category as well as such embodiments described above.

Therefore, such embodiments described should be regarded as examples, not limited, and accordingly the present invention is subject to change within the category of the claim attached and the same category, including but not limited to the description.

What is claimed is:

1. A golf simulation apparatus, comprising:
    a housing which is comprised of front, rear, upper and left and right side with an internal space including a monitor installation section that is provided in the direction of the rear side from the said front side;
    a golf simulation computer which is provided in the said internal space;
    a monitor to be seated in the said monitor installation section;
    a monitor protection plate to be installed separating from the said front housing to protect the said monitor from the hit golf ball; and
    additional supporting means to support the said monitor protection plate so that the said monitor protection plate can be erected at a required angle.

2. The golf simulation apparatus of claim 1, wherein the said monitor installation section comprises:
    a rear supporting part supporting a bottom part to place the said monitor and rear side of the said monitor with a slope in the rear direction against a vertical surface.

3. The golf simulation apparatus of claim 2, wherein the said monitor installation section is formed in the said housing so that the said monitor is positioned in the same visual field zone as the golf tee.

4. The golf simulation apparatus of claim 1, further comprising:
    a sensor installation section in the front of the said housing separating from the said monitor installation section to install a kinetic sensor; and
    additional kinetic sensor to be installed in the said sensor installation section.

5. The golf simulation apparatus of claim 1, further comprising:
    additional flood door to watch a screen of the said monitor seated in the said monitor installation section even when it is closed while opening/closing the said monitor installation section to protect the said monitor.

6. The golf simulation apparatus of claim 2, further comprising:
    one or more club hanging rack(s) to hang the golf club on one side of the said housing.

7. The golf simulation apparatus of claim 1, further comprising:
    additional monitor protection means that can watch the said monitor screen installing in the said front housing so that the said monitor seated in the said monitor installation section can be protected from a hit golf ball.

8. The golf simulation apparatus of claim 1, further comprising:

a seating board accommodation section in front of the said housing, separated from the said monitor installation section; a seating hole to be able to seat the kinetic sensor; and additional seating board for the sensor to be haunted in the said seating board accommodation section.

9. The golf simulation apparatus of claim 1, further comprising:

additional sensor insert section provided in the said front housing which is separate from the said monitor installation section so that the kinetic sensor can be inserted.

10. The golf simulation apparatus of claim 1, further comprising:

additional monitor slope angle adjusting means to adjust the slope angle that the said monitor is tilted backward.

11. The golf simulation apparatus of claim 1, further comprising:

additional rain shield to be installed in the said housing to block the rain comes into the said front housing.

12. The golf simulation apparatus of claim 1, further comprising:

an arm haunting unit to haunt an arm of a golf ball feeder in the lower front side of the said housing; and additional golf ball feeder to feed a golf ball to the outside of the said housing through the said arm haunting unit, installed in the internal space of the said housing.

13. The golf simulation apparatus of claim 12, further comprising:

for the said golf ball feeder, a seating ring which receives the golf ball to be fed;

a ball detection sensor to output a detection signal by sensing that the golf ball is received in the said seating ring;

a control board to output a motor drive signal to drive a motor based on the signal to be output from the said ball detection sensor;

a motor to be driven by the motor drive signal to be output from the said control board; and a rotation arm to feed the golf ball to the outside of the said housing by haunting the said haunting unit after rotating according to the drive of the said motor.

14. The golf simulation apparatus of claim 12, further comprising:

a storage box keeping the golf ball to be fed to the said golf ball feeder with the said housing; and additional conveying pipe which is a path to feed the golf ball provided from the said storage box to the said golf ball feeder.

15. The golf simulation apparatus of claim 1, further comprising:

a discharger provided in one side of the said housing; and additional cooling means to be sent to the said discharger after generating a cooling air, provided in the said internal space.

16. The golf simulation apparatus of claim 15, further comprising:

additional inlet formed in other side of the said housing to have the air flow in; and a heat exchanger to generate the cooling air by exchanging the heat with the air flowing in from the said inlet, and the said cooling means provided in the said internal space.

17. The golf simulation apparatus of claim 1, further comprising:

a discharger, formed in one side of the said housing; and additional heating means to send warm air generated to the said discharger, provided in the said internal space.

18. The golf simulation apparatus of claim 1, wherein the said golf simulation computer extracts a current play state function based on the kinetic data of the golf ball to be input from the kinetic sensor and outputs discharge signal of a gift ticket in case that the current play state function is corresponded to the gift ticket present play state function which becomes the target for presenting the gift ticket, the apparatus further comprising:

additional gift ticket discharger to discharge the gift ticket if a gift ticket discharge signal is received from the said golf simulation computer, provided in the internal space of the said housing; and a gift ticket discharger in the said front housing to discharge the gift ticket to be discharged from the said gift ticket discharger to the outside of the said housing.

19. The golf simulation apparatus of claim 1, wherein the said golf simulation computer extracts the current play state function based on the kinetic data of the golf ball to be input from the kinetic sensor and outputs a discharge signal of the giveaway in case that the current play state function is corresponded to a giveaway present play state function which becomes the target for presenting the giveaway, the apparatus further comprising:

additional discharger for the giveaway to discharge the giveaway if a giveaway discharge signal is received from the said golf simulation computer, provided in the internal space of the said housing.

20. The golf simulation apparatus of claim 1, further comprising:

additional tee mat using for a golf swing box for player in case of unfolding whereas if it is folded the said monitor can be covered and protected since it is installed to be able to rotate in the front lower side of the said housing as a golf tee is installed.

21. The golf simulation apparatus of claim 1, further comprising:

additional projector to scan an image data to the screen transmitted from the said golf simulation computer, provided in the said housing, wherein the said golf simulation computer features that it outputs a kinetic flying data of the golf ball to the said projector.

* * * * *